US012632951B2

(12) United States Patent
Wang et al.

(10) Patent No.: US 12,632,951 B2
(45) Date of Patent: May 19, 2026

(54) METHOD FOR DETECTING DEFECT AND METHOD FOR TRAINING MODEL

(71) Applicants: Beijing Zhongxiangying Technology Co., Ltd., Beijing (CN); BOE TECHNOLOGY GROUP CO., LTD., Beijing (CN)

(72) Inventors: Yaoping Wang, Beijing (CN); Zhaoyue Li, Beijing (CN); Haodong Yang, Beijing (CN); Meijuan Zhang, Beijing (CN); Dong Chai, Beijing (CN); Hong Wang, Beijing (CN)

(73) Assignees: Beijing Zhongxiangying Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 508 days.

(21) Appl. No.: 17/764,707

(22) PCT Filed: Jan. 28, 2021

(86) PCT No.: PCT/CN2021/074263
§ 371 (c)(1),
(2) Date: Mar. 29, 2022

(87) PCT Pub. No.: WO2022/160222
PCT Pub. Date: Aug. 4, 2022

(65) Prior Publication Data
US 2023/0206420 A1    Jun. 29, 2023

(51) Int. Cl.
*G06T 7/00* (2017.01)

(52) U.S. Cl.
CPC .... *G06T 7/001* (2013.01); *G06T 2207/20081* (2013.01); *G06T 2207/20084* (2013.01)

(58) Field of Classification Search
CPC ......... G06T 7/001; G06T 7/0004; G06T 7/62; G06T 2207/20081; G06T 2207/20084;
(Continued)

(56) References Cited

U.S. PATENT DOCUMENTS

| 10,607,331 B1 | 3/2020 | Tandia et al. |
| 2019/0065979 A1 | 2/2019 | Shao et al. |

(Continued)

FOREIGN PATENT DOCUMENTS

| CN | 106645180 A | 5/2017 | |
| CN | 108352339 A * | 7/2018 | ......... G01N 21/8851 |

(Continued)

OTHER PUBLICATIONS

Diaz et al., An effective algorithm for hyperparameter optimization of neural networks, 2017 (Year: 2017).*
(Continued)

*Primary Examiner* — Barbara D Reinier
(74) *Attorney, Agent, or Firm* — Perilla Knox & Hildebrandt LLP; Kenneth A. Knox

(57) ABSTRACT

A method and device for detecting a defect and method for training a model are provided. The method for detecting the defect includes: acquiring a sample data set and identifying feature information of the sample data set; acquiring an initial model; configuring a training parameter based on the feature information; obtaining a target model by training, according to the training parameter, the initial model with the sample data set; and obtaining defect information of a product by inputting real data of the product into the target model. The training parameter includes at least one of a learning rate descent strategy, a total number of training rounds and a test strategy, the learning rate descent strategy includes a number of learning rate descents and a round (Continued)

number when a learning rate descends, and the test strategy includes a number of tests and a round number when testing.

17 Claims, 14 Drawing Sheets

(58) Field of Classification Search
CPC . G06T 2207/30108; G06T 2207/30164; G06T 3/40
See application file for complete search history.

(56) References Cited

U.S. PATENT DOCUMENTS

| | | | | |
|---|---|---|---|---|
| 2019/0164055 | A1* | 5/2019 | Ljung Larhed | G06N 3/08 |
| 2019/0318240 | A1* | 10/2019 | Kulkarni | G06N 3/08 |
| 2020/0027009 | A1 | 1/2020 | Khan et al. | |
| 2020/0349875 | A1 | 11/2020 | Wen et al. | |
| 2020/0380301 | A1 | 12/2020 | Siracusa et al. | |
| 2021/0192714 | A1* | 6/2021 | Bhatt | G06T 7/11 |
| 2023/0048386 | A1* | 2/2023 | Wang | G06T 7/0004 |

FOREIGN PATENT DOCUMENTS

| | | | | | |
|---|---|---|---|---|---|
| CN | 108802041 | A | | 11/2018 | |
| CN | 108961238 | A | | 12/2018 | |
| CN | 109143199 | A | | 1/2019 | |
| CN | 109146873 | A | | 1/2019 | |
| CN | 109559298 | A | * | 4/2019 | G06K 9/627 |
| CN | 109683360 | A | | 4/2019 | |
| CN | 110020691 | A | | 7/2019 | |
| CN | 110378887 | A | | 10/2019 | |
| CN | 110675789 | A | | 1/2020 | |
| CN | 111080633 | A | | 4/2020 | |
| CN | 111160432 | A | | 5/2020 | |
| CN | 111325744 | A | | 6/2020 | |
| CN | 111340233 | A | | 6/2020 | |
| CN | 111951212 | A | * | 11/2020 | |
| CN | 112990035 | A | | 6/2021 | |
| WO | WO-2017096758 | A1 | * | 6/2017 | G06F 18/254 |
| WO | 2018090355 | A1 | | 5/2018 | |

OTHER PUBLICATIONS

International Search Report and Written Opinion for International Application No. PCT/CN2021/074263 mailed Oct. 27, 2021.

"Mobile Phone Screen Defect Detection Based on Deep Convolutional Neural Network," University of Electronic Science and Technology of China (Alleged Publication: Jan. 15, 2020).

Extended European Search Report for EP Patent Application No. 21921830.2 of Jul. 11, 2023.

Jiang J, Cao P, Lu Z, Lou W, Yang Y. Surface Defect Detection for Mobile Phone Back Glass Based on Symmetric Convolutional Neural Network Deep Learning. Applied Sciences. 2020; 10(10):3621. https://doi.org/10.3390/app10103621.

First Office Action for JP Patent Application No. 2022-571810 of Dec. 16, 2024.

Machine Learning Practice (Hyperparameter Tuning), Kikagaku (Alleged Publication: Aug. 5, 2021).

Non-Final Office Action for U.S. Appl. No. 17/978,384 of Apr. 23, 2025.

Z. C. Lipton, C. Elkan, and B. Narayanaswamy, "Thresholding Classifiers to Maximize F1 Score," arXiv preprint arXiv:1402.1892, May 2014. [Online]. Available: https://doi.org/10.48550/arXiv.1402.1892.

* cited by examiner

100

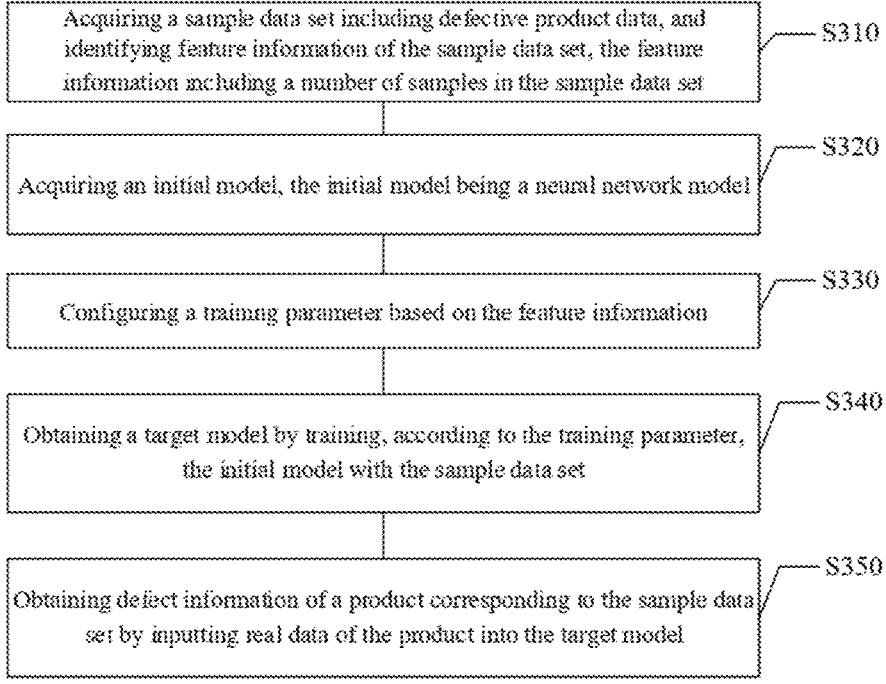

Acquiring a sample data set including defective product data, and identifying feature information of the sample data set, the feature information including a number of samples in the sample data set — S310

Acquiring an initial model, the initial model being a neural network model — S320

Configuring a training parameter based on the feature information — S330

Obtaining a target model by training, according to the training parameter, the initial model with the sample data set — S340

Obtaining defect information of a product corresponding to the sample data set by inputting real data of the product into the target model — S350

FIG. 3

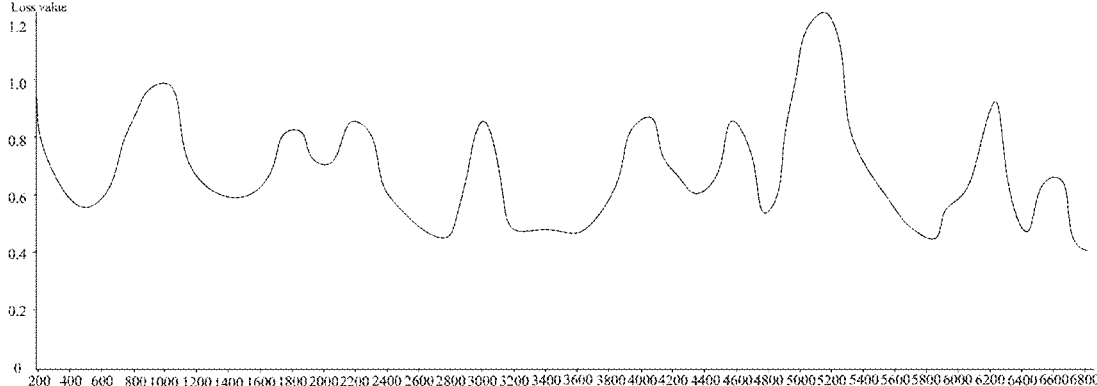

FIG. 4

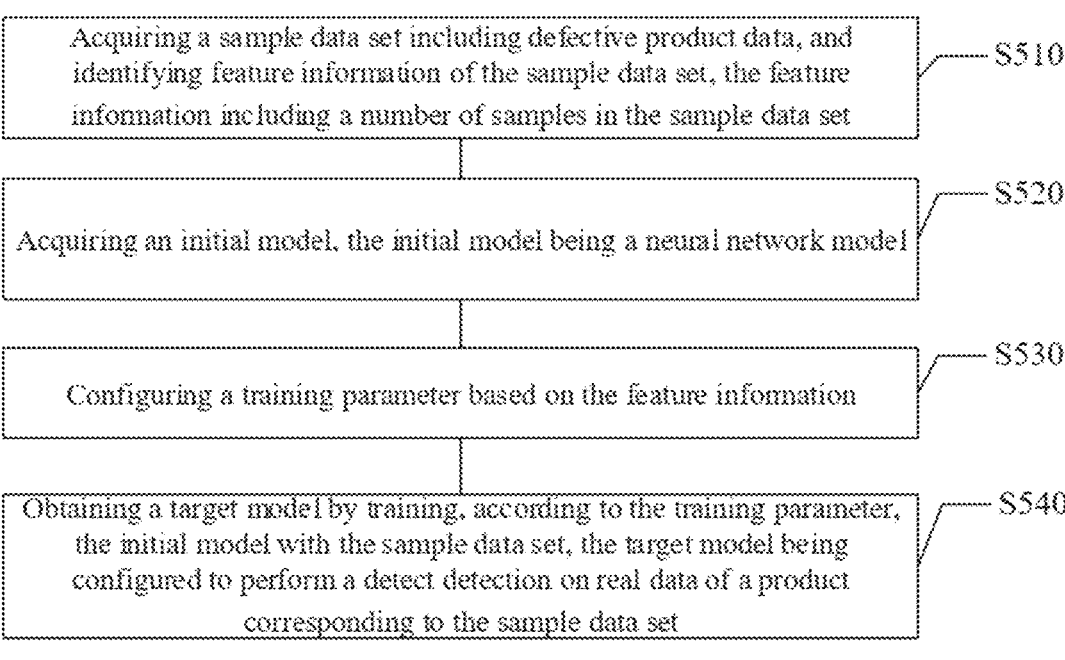

Acquiring a sample data set including defective product data, and identifying feature information of the sample data set, the feature information including a number of samples in the sample data set — S510

Acquiring an initial model, the initial model being a neural network model — S520

Configuring a training parameter based on the feature information — S530

Obtaining a target model by training, according to the training parameter, the initial model with the sample data set, the target model being configured to perform a detect detection on real data of a product corresponding to the sample data set — S540

FIG. 5

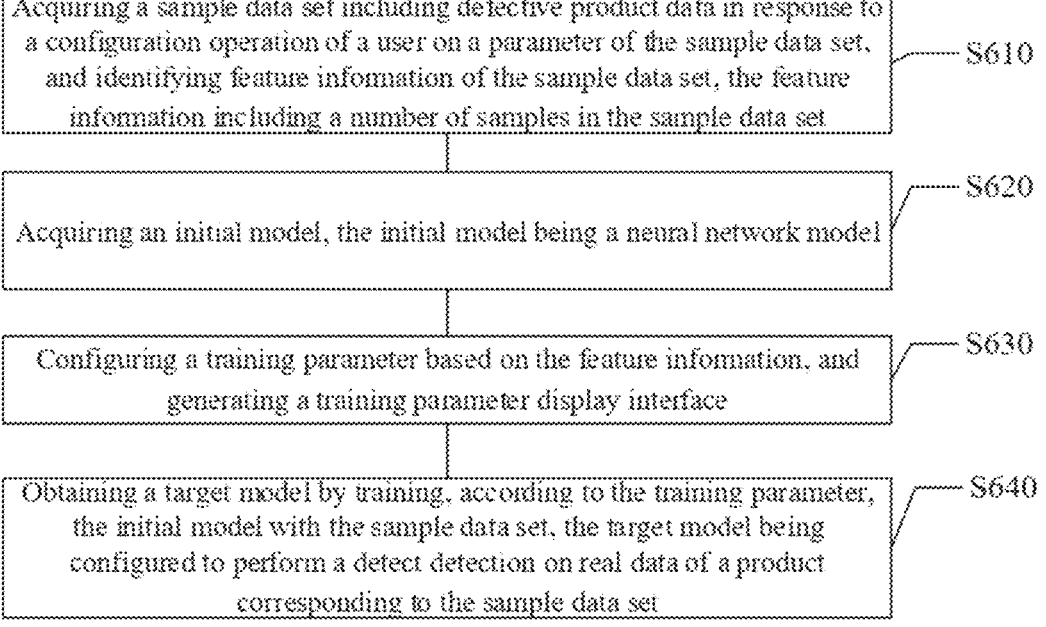

Acquiring a sample data set including defective product data in response to a configuration operation of a user on a parameter of the sample data set, and identifying feature information of the sample data set, the feature information including a number of samples in the sample data set — S610

Acquiring an initial model, the initial model being a neural network model — S620

Configuring a training parameter based on the feature information, and generating a training parameter display interface — S630

Obtaining a target model by training, according to the training parameter, the initial model with the sample data set, the target model being configured to perform a detect detection on real data of a product corresponding to the sample data set — S640

FIG. 6

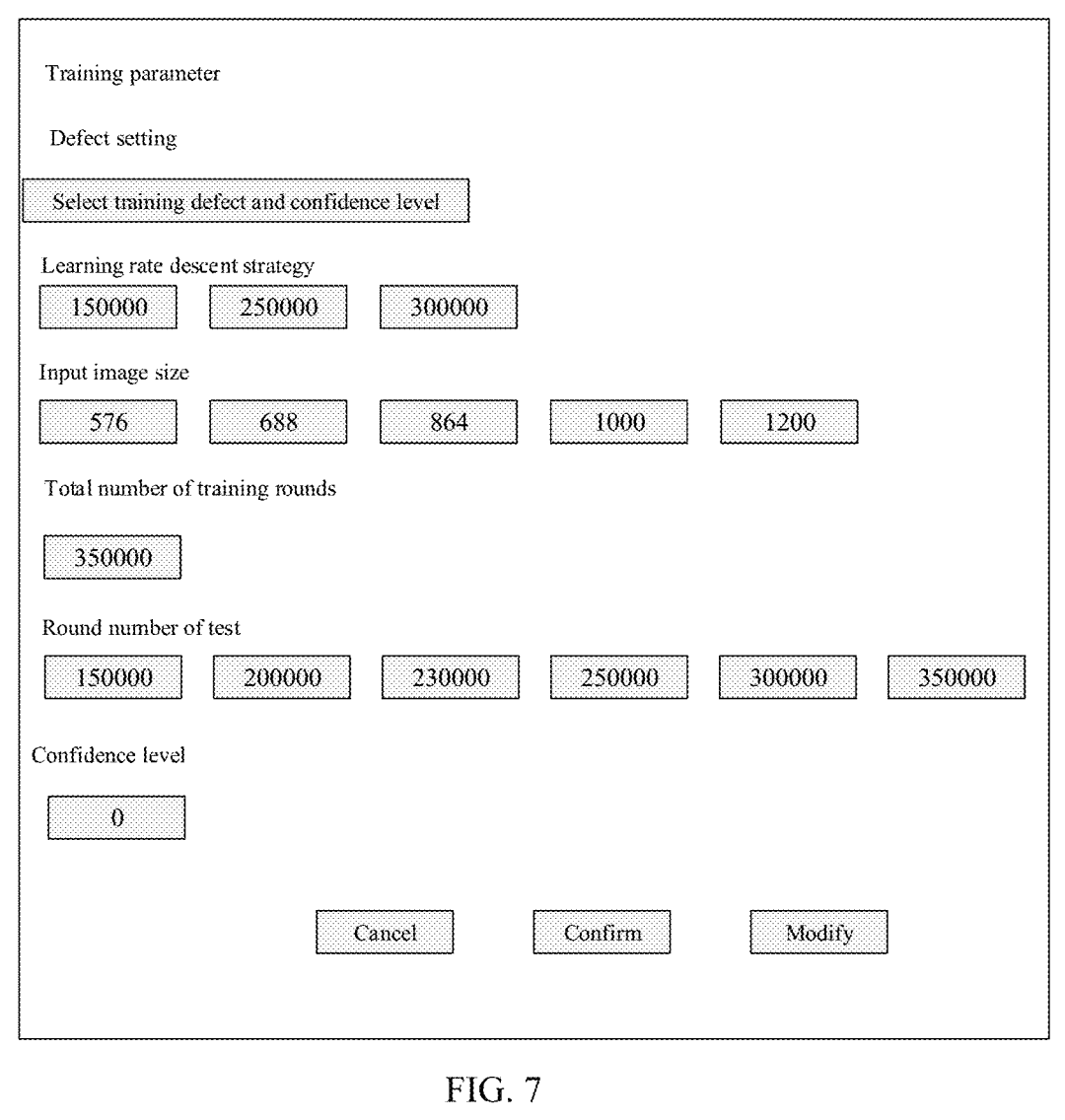

Training parameter

Defect setting

| Select training defect and confidence level |

Learning rate descent strategy

| 150000 | | 250000 | | 300000 |

Input image size

| 576 | | 688 | | 864 | | 1000 | | 1200 |

Total number of training rounds

| 350000 |

Round number of test

| 150000 | | 200000 | | 230000 | | 250000 | | 300000 | | 350000 |

Confidence level

| 0 |

| Cancel | | Confirm | | Modify |

FIG. 7

| ID | Defect | Quantity | Training? | Confidence level |
|----|--------|----------|-----------|------------------|
| 0 | First defect | 53 | ▨ | |
| 1 | Second defect | 164 | ▨ | |
| 2 | Third defect | 23 | ☐ | |
| 3 | Fourth defect | 1197 | ▨ | |
| 4 | Fifth defect | 5 | ☐ | |
| 5 | Sixth defect | 1 | ☐ | |

FIG. 8

| UID | Data set path | Name | Initial model | Start time | Trainer | Training reason | Current round number | Total number of rounds | Operation | |
|-----|---------------|------|---------------|------------|---------|-----------------|----------------------|------------------------|-----------|---|
| xxx | Path1 | xxx | | xxx | xxx | xxx | 350000 | 350000 | Cancel | Details |
| xxx | Path2 | xxx | | xxx | xxx | xxx | 208600 | 500000 | Cancel | Details |
| xxx | Path3 | xxx | | xxx | xxx | xxx | 0 | 350000 | Cancel | Details |
| xxx | Path4 | xxx | | xxx | xxx | xxx | 330800 | 400000 | Cancel | Details |
| xxx | Path5 | xxx | | xxx | xxx | xxx | 340000 | 400000 | Cancel | Details |
| xxx | Path6 | xxx | | xxx | xxx | xxx | 38400 | 350000 | Cancel | Details |

FIG. 9

| | First defect | Second defect | Third defect | Fourth defect | Recall rate |
|--|--------------|---------------|--------------|---------------|-------------|
| First defect | 1244 | 27 | 0 | 18 | 0.9094 |
| Second defect | 171 | 1305 | 0 | 11 | 0.9324 |
| Third defect | 3 | 1 | 119 | 2 | 0.9944 |
| Fourth defect | 2 | 0 | 0 | 352 | 0.000 |

FIG. 10

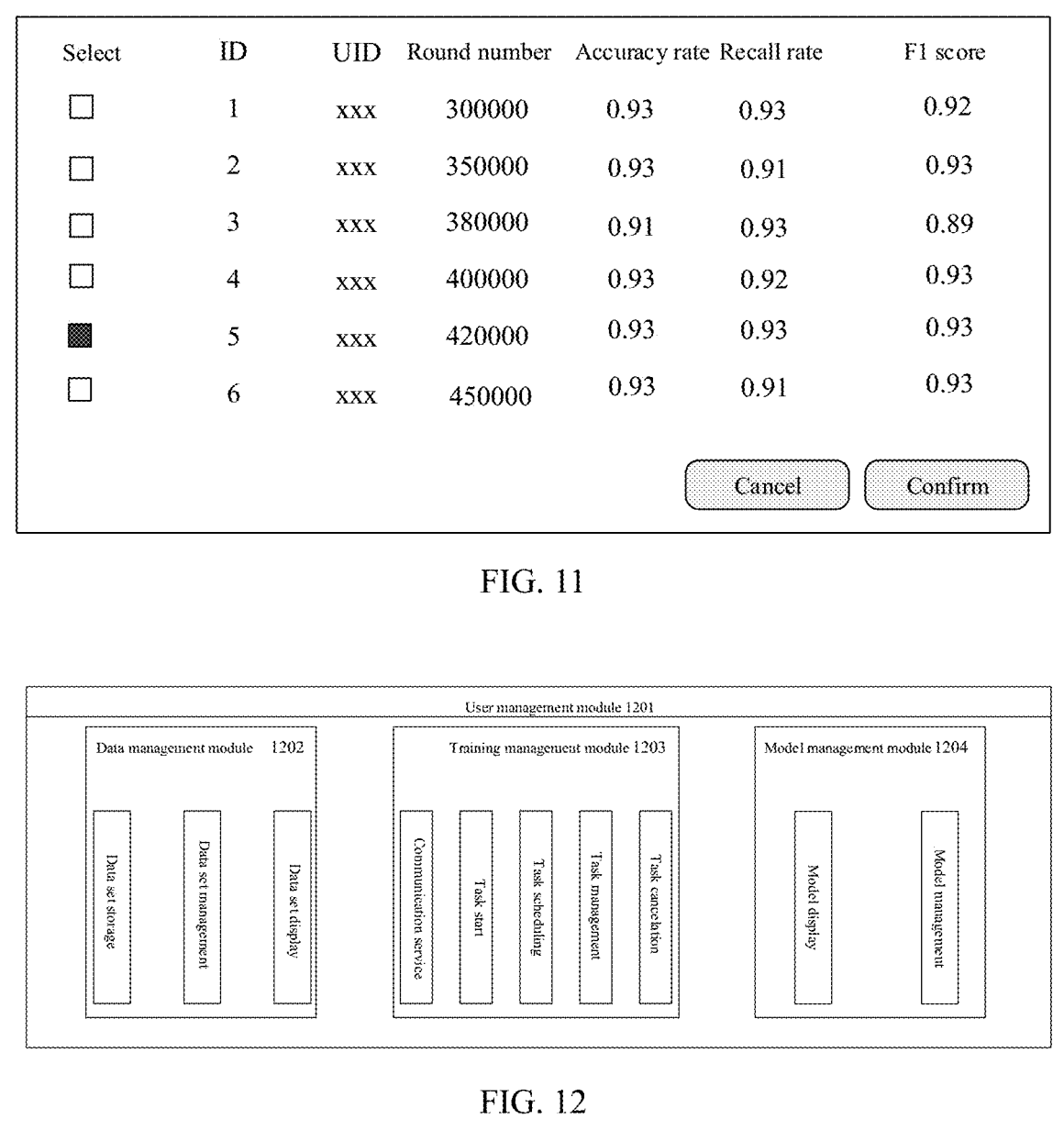

| Select | ID | UID | Round number | Accuracy rate | Recall rate | F1 score |
|--------|----|----|--------------|---------------|-------------|----------|
| ☐ | 1 | xxx | 300000 | 0.93 | 0.93 | 0.92 |
| ☐ | 2 | xxx | 350000 | 0.93 | 0.91 | 0.93 |
| ☐ | 3 | xxx | 380000 | 0.91 | 0.93 | 0.89 |
| ☐ | 4 | xxx | 400000 | 0.93 | 0.92 | 0.93 |
| ▨ | 5 | xxx | 420000 | 0.93 | 0.93 | 0.93 |
| ☐ | 6 | xxx | 450000 | 0.93 | 0.91 | 0.93 |

Cancel     Confirm

FIG. 11

User management module 1201

Data management module 1202

Data set storage

Data set management

Data set display

Training management module 1203

Communication service

Task start

Task scheduling

Task management

Task cancelation

Model management module 1204

Model display

Model management

FIG. 12

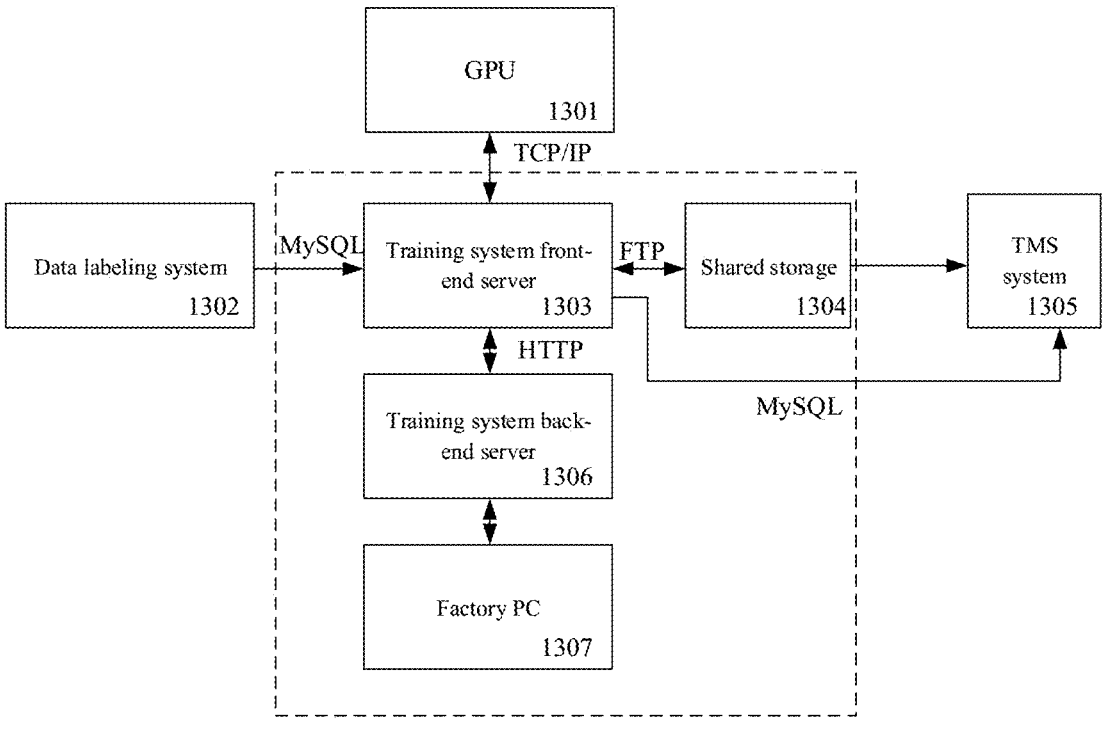

FIG. 13

| ID | Product | Defect type | Number of images | Defect with the fewest images | Number of the fewest images | Last updating time | Operation | |
|----|---------|-------------|------------------|-------------------------------|----------------------------|--------------------|-----------|---|
| 106 | Product 1 | 48 | 65302 | First defect | 0 | First time point | Sync | Stats |
| 107 | Product 2 | 53 | 35864 | Second defect | 0 | Second time point | Sync | Stats |
| 108 | Product 3 | 24 | 12078 | Third defect | 0 | Third time point | Sync | Stats |
| 109 | Product 4 | 53 | 35068 | Fourth defect | 1 | Fourth time point | Sync | Stats |
| 200 | Product 5 | 52 | 40535 | Fifth defect | 0 | Fifth time point | Sync | Stats |
| 201 | Product 6 | 50 | 28799 | Sixth defect | 0 | Sixth time point | Sync | Stats |

FIG. 14

| User management | Data set management | | | | | | | | | |
|---|---|---|---|---|---|---|---|---|---|---|
| Data set management | ID | Data set name | Data set path | Creating time | Creator | Operation | | | | |
| | 106 | Test | First path | XXX | XXX | Change | Delete | Details | Upload | Stats |
| Model management | 106 | Mk | Second path | XXX | XXX | Change | Delete | Details | Upload | Stats |
| Training management | | | | | | | | | | |

FIG. 15

| Department | XXX |
|---|---|
| Section | XXX |
| Site | XXX |
| Data set name | XXX |

Cancel    Confirm

FIG. 16

| User management | | | | |
|---|---|---|---|---|
| Data set management | ▽ xxx | ID | Name | Operation |
| | ▽ xxx | 0 | xxx | Delete   Details |
| | ▽ xxx | 1 | xxx | Delete   Details |
| Model management | xxx | 2 | xxx | Delete   Details |
| | xxx | 3 | xxx | Delete   Details |
| Training management | xxx | 4 | xxx | Delete   Details |
| | xxx | 5 | xxx | Delete   Details |

FIG. 17

| ID | Name | Path | Creating time | Creator | Operation |
|---|---|---|---|---|---|
| 1 | Name 1 | Path 1 | xxx | xxx | Delete   Details   Model name alteration |
| 2 | Name 2 | Path 2 | xxx | xxx | Delete   Details   Model name alteration |
| 3 | Name 3 | Path 3 | xxx | xxx | Delete   Details   Model name alteration |
| 4 | Name 4 | Path 4 | xxx | xxx | Delete   Details   Model name alteration |
| 5 | Name 5 | Path 5 | xxx | xxx | Delete   Details   Model name alteration |
| 6 | Name 6 | Path 6 | xxx | xxx | Delete   Details   Model name alteration |

FIG. 18

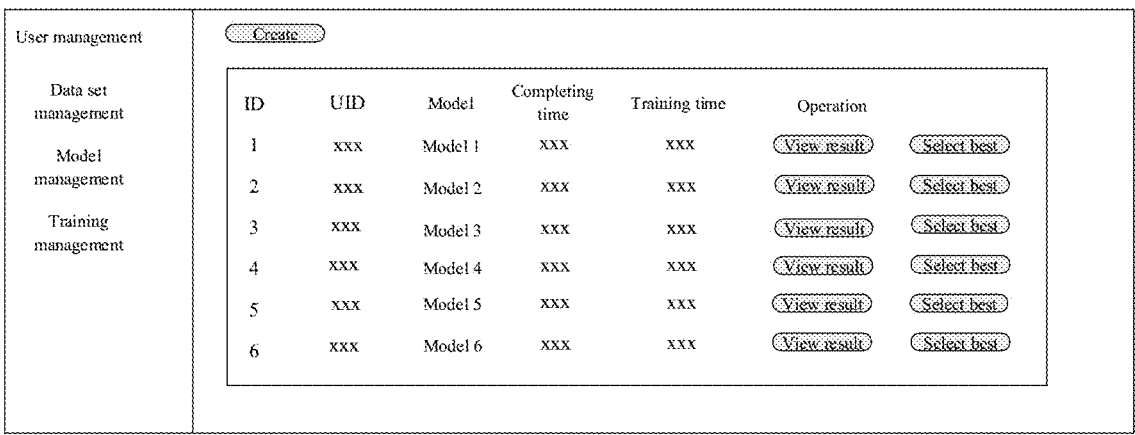

| User management | Create | | | | | | |
|---|---|---|---|---|---|---|---|
| Data set management | ID | UID | Model | Completing time | Training time | Operation | |
| | 1 | XXX | Model 1 | XXX | XXX | View result | Select best |
| Model management | 2 | XXX | Model 2 | XXX | XXX | View result | Select best |
| | 3 | XXX | Model 3 | XXX | XXX | View result | Select best |
| Training management | 4 | XXX | Model 4 | XXX | XXX | View result | Select best |
| | 5 | XXX | Model 5 | XXX | XXX | View result | Select best |
| | 6 | XXX | Model 6 | XXX | XXX | View result | Select best |

FIG. 19

User management

Data set management

Model management

Training management

| Department | XXX |
|---|---|
| Section | XXX |
| Site | XXX |
| Image type | XXX |
| Product | XXX |
| Training type | XXX |
| Training parameter | Viewing modification |
| Training reason | XXX |

FIG. 20

| UID | Data set path | Name | Initial model | Start time | Trainer | Training reason | Current round number | Total number of rounds | Operation | |
|---|---|---|---|---|---|---|---|---|---|---|
| XXX | Path 1 | XXX | | XXX | XXX | XXX | 350000 | 350000 | Cancel | Details |
| XXX | Path 2 | XXX | | XXX | XXX | XXX | 208600 | 500000 | Cancel | Details |
| XXX | Path 3 | XXX | | XXX | XXX | XXX | 0 | 350000 | Cancel | Details |
| XXX | Path 4 | XXX | | XXX | XXX | XXX | 330800 | 400000 | Cancel | Details |
| XXX | Path 5 | XXX | | XXX | XXX | XXX | 340000 | 400000 | Cancel | Details |
| XXX | Path 6 | XXX | | XXX | XXX | XXX | 38400 | 350000 | Cancel | Details |

FIG. 21

METHOD FOR DETECTING DEFECT AND METHOD FOR TRAINING MODEL

CROSS-REFERENCE TO RELATED APPLICATIONS

The present disclosure is a national phase entry under 35 U.S.C. § 371 of International Application No. PCT/CN2021/074263 filed on Jan. 28, 2021 and titled "METHOD AND DEVICE FOR DETECTING DEFECT, METHOD AND DEVICE FOR TRAINING MODEL AND ELECTRONIC DEVICE," the entire contents of which are hereby incorporate by reference herein in its entirety.

TECHNICAL FIELD

The present disclosure relates to the technical field of defect detection, and in particular, to a method and device for detecting a defect, a method and device for training a model, a computer-readable storage medium and an electronic device.

BACKGROUND

In the field of screen production, as there may be a problem in aspects such as equipment, parameter, operation and environmental interference, a product produced may have a defect. With the rise of artificial intelligence algorithms such as deep learning, a deep learning algorithm model is widely used for defect detection.

However in the prior art, a parameter in the deep learning algorithm model is generally adjusted artificially, which wastes human resources and may cause losses due to human errors.

It should be noted that the information of the present disclosure in the above background section is only used for enhancing the understanding of the background of the present disclosure, and therefore may include information that does not constitute the prior art known to those skilled in the art.

SUMMARY

Other features and advantages of the present disclosure will become apparent from the following detailed description, or be learned in part by practice of the present disclosure.

A first aspect of the present disclosure provides a method for detecting a defect, including:

acquiring a sample data set including defective product data, and identifying feature information of the sample data set, the feature information including a number of samples in the sample data set;

acquiring an initial model, the initial model being a neural network model;

configuring a training parameter based on the feature information;

obtaining a target model by training, according to the training parameter, the initial model with the sample data set; and obtaining defect information of a product corresponding to the sample data set by inputting real data of the product into the target model, the training parameter includes at least one of a learning rate descent strategy, a total number of training rounds and a test strategy, the learning rate descent strategy includes a number of learning rate descents and a round number when a learning rate descends, and the test strategy includes a number of tests and a round number when testing.

A second aspect of the present disclosure provides a method for training a model, including:

acquiring a sample data set including defective product data, and identifying feature information of the sample data set, the feature information including a number of samples in the sample data set;

acquiring an initial model, the initial model being a neural network model;

configuring a training parameter based on the feature information; and obtaining a target model by training, according to the training parameter, the initial model with the sample data set, the target model being configured to perform a detect detection on real data of a product corresponding to the sample data set, the training parameter includes at least one of a learning rate descent strategy, a total number of training rounds and a test strategy, the learning rate descent strategy includes a number of learning rate descents and a round number when a learning rate descends, and the test strategy includes a number of tests and a round number when testing.

A third aspect of the present disclosure provides a method for training a model, including:

acquiring a sample data set including defective product data in response to a configuration operation of a user on a parameter of the sample data set, and identifying feature information of the sample data set, the feature information including a number of samples in the sample data set;

acquiring an initial model, the initial model being a neural network model;

configuring a training parameter based on the feature information, and generating a training parameter display interface; and obtaining a target model by training, according to the training parameter, the initial model with the sample data set, the target model being configured to perform a detect detection on real data of a product corresponding to the sample data set, the training parameter displayed on the training parameter display interface includes at least one of a learning rate descent strategy, a total number of training rounds and a test strategy, the learning rate descent strategy includes a number of learning rate descents and a round number when a learning rate descends, and the test strategy includes a number of tests and a round number when testing.

A fourth aspect of the present disclosure provides a system for detecting a defect, including:

a data management module, configured to store and manage sample data;

a training management module, configured to perform any one of the above methods for detecting the defect, any one of the above methods for training the model, or any one of the above methods for training the model; and a model management module, configured to store, display and manage the target model.

A fifth aspect of the present disclosure provides a computer-readable storage medium, having a computer program stored thereon that, when being executed by a processor, implements any one of the above methods for detecting the defect, any one of the above methods for training the model, or any one of the above methods for training the model.

A sixth aspect of the present disclosure provides an electronic device, including:

a processor; and a memory having one or more programs stored thereon that, when being executed by the one or more processors, cause the one or more processors to implement any one of the above methods for detecting the defect, any one of the above methods for training the model, or any one of the above methods for training the model.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments that conform to the present disclosure, and together with the specification, serve to explain the principle of the present disclosure. The drawings in the following description are only some embodiments of the present disclosure, and other drawings can be obtained by those skilled in the art from these drawings without creative work.

FIG. 3 schematically shows a flowchart of a method for detecting a defect in an embodiment of the present disclosure;

FIG. 4 schematically shows a schematic diagram of a loss curve in an embodiment of the present disclosure;

FIG. 5 schematically shows a flowchart of a method for training a model in an embodiment of the present disclosure;

FIG. 6 schematically shows a flowchart of another method for training a model in an embodiment of the present disclosure;

FIG. 7 schematically shows a schematic diagram of a training parameter display interface in an embodiment of the present disclosure;

FIG. 8 schematically shows a selection interface diagram for determining whether to train a defect in an embodiment of the present disclosure;

FIG. 9 schematically shows a schematic diagram of a training process in an embodiment of the present disclosure;

FIG. 10 schematically shows a schematic diagram of a confusion matrix in an embodiment of the present disclosure;

FIG. 11 schematically shows a selection interface diagram of a target model in an embodiment of the present disclosure;

FIG. 12 schematically shows a schematic structural diagram of a system for detecting a defect in an embodiment of the present disclosure;

FIG. 13 schematically shows a frame diagram of a system for detecting a defect in an embodiment of the present disclosure;

FIG. 14 schematically shows a schematic interface diagram of data set preparation in an embodiment of the present disclosure;

FIG. 15 schematically shows a diagram of a training data set management interface in an embodiment of the present disclosure;

FIG. 16 schematically shows a schematic diagram of an interface for creating new data in an embodiment of the present disclosure;

FIG. 17 schematically shows a diagram of a detailed information display interface of a data set in an embodiment of the present disclosure;

FIG. 18 schematically shows a diagram of a model management interface in an embodiment of the present disclosure;

FIG. 19 schematically shows a diagram of an interface for creating a training task in an embodiment of the present disclosure;

FIG. 20 schematically shows a diagram of an interface for modifying a training parameter in an embodiment of the present disclosure;

FIG. 21 schematically shows a schematic diagram of a display interface of a model training process in an embodiment of the present disclosure;

DETAILED DESCRIPTION

Figure 1:
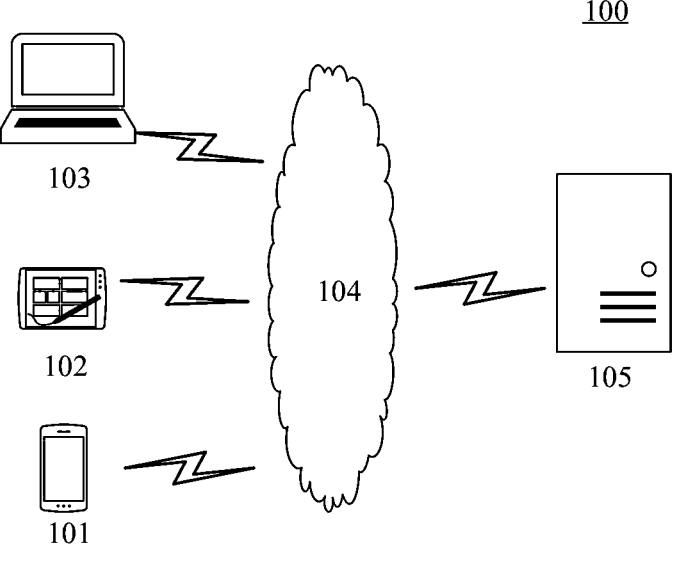
FIG. 1 shows a schematic diagram of an system architecture to an embodiment of the present disclosure may be applied.

Example embodiments will now be described more fully with reference to the accompanying drawings. However, the example embodiments may be implemented in various forms, and should not be construed as being limited to the embodiments set forth herein; on the contrary, these embodiments are provided so that the present disclosure will be comprehensive and complete, and fully convey the concept of the example embodiments to those skilled in the art. The described features, structures, or characteristics may be combined in any suitable manner in one or more embodiments.

Furthermore, the drawings are merely schematic illustrations of the present disclosure and are not necessarily drawn to scale. The same reference numerals in the drawings indicate the same or similar parts, and thus their repeated descriptions will be omitted. Some of the block diagrams shown in the figures are functional entities that do not necessarily correspond to physically or logically separate entities. These functional entities may be implemented in software, or in one or more hardware modules or integrated circuits, or in different networks and/or processor devices and/or microcontroller devices.

FIG. 1 shows a schematic diagram of a system architecture of an exemplary application environment to which a method and device for detecting a defect according to an embodiment of the present disclosure may be applied.

As shown in FIG. 1, a system architecture 100 may include a network 104, a server 105 and one or more of terminal devices 101, 102 and 103. The network 104 is a medium for providing a communication link between the terminal devices 101, 102 and 103 and the server 105. The network 104 may include various connection types, such as wired, wireless communication links, or fiber optic cables. The terminal devices 101, 102, and 103 may be various electronic devices having a function of detecting a defect, including but not limited to a desktop computer, a portable computer, a smart phone, a tablet computer, and the like. It should be understood that the numbers of terminal devices, networks and servers in FIG. 1 are merely illustrative. There may be any number of terminal devices, networks and servers according to the implementation need. For example, the server 105 may be a server cluster composed of a plurality of servers.

A method for detecting a defect provided in an embodiment of the present disclosure may be executed by the terminal devices 101, 102, and 103, and correspondingly, a device for detecting a defect may be disposed in the terminal devices 101, 102, and 103. However, those skilled in the art may easily understand that the method for detecting the defect provided by an embodiment of the present disclosure may also be executed by the server 105, and correspondingly, the device for detecting the defect may also be disposed in the server 105. However, the embodiment of the present disclosure is not limited thereto. For example, in an embodiment, the terminal devices 101, 102, and 103 may acquire a sample data set including defective product data, and identify feature information in the sample data set which includes a number of samples of the sample data set, and then upload the sample data set of original sample data to the server 105. The server acquires an initial model, configures a training parameter based on the feature information, obtains a target model by training, according to the training parameter, the initial model with the sample data set, obtains defect information of a product corresponding to the sample data set by inputting real data of the product into the target model, and transmits the defect information to the terminal devices 101, 102 and 103.

An embodiment of the present disclosure provides an electronic device for implementing a method for detecting a device, which may be the terminal devices 101, 102 and 103 or the server 105 in FIG. 1. The electronic device includes at least a processor and a memory for storing executable instructions of the processor, and the processor is configured to perform the method for detecting the defect by executing the executable instructions.

In an embodiment of the present disclosure, the above system architecture may be a distributed product defect analysis system, which may be a system formed by a group of computers which are interconnected, transmit messages, communicate with each other and coordinate behaviors through a network. Components interact with each other to achieve a common target. The network may be the Internet of Things based on the Internet and/or a telecommunication network, which may be a wired network or a wireless network, for example a local area network (LAN), a metropolitan area network (MAN), a wide area network (WAN)), a cellular data communication networks and other electronic networks that can realize the function of information exchange. A distributed computing system may have software components such as software objects or other types of individually addressable isolated entities such as distributed objects, agents, actors, virtual components, and the like. Typically, each such component is individually addressable and has a unique identity (such as an integer, GUID, string, or opaque data structure) in the distributed system. In a distributed system that allows geographic distribution, an application may be deployed to reside in a cluster. There are various systems, components, and network configurations that support a distributed computing environment. For example, computing systems may be connected together by wired or wireless systems, by local networks or widely distributed networks. Currently, many networks are coupled to the Internet, which provides an infrastructure for widely distributed computing, and includes many different networks, although any network infrastructure may be used for system-prone communications such as those described in various examples.

A distributed product defect analysis system provides sharing of computer resources and services through communication exchanges between computing devices and systems. These resources and services include information exchange, cache storage, and disk storage for objects (e.g., files). These resources and services also include the sharing of processing capacities across a plurality of processing units for load balancing, resource scaling, specialization of processing and the like. For example, the distributed product defect analysis system may include a host having for example client devices/servers and network topologies and network infrastructures of peer-to-peer or hybrid architectures.

The structure of the electronic device will be described below by taking a mobile terminal 200 in FIG. 2 as an example. It would be understood by those skilled in the art that the configuration in FIG. 2 may also be applied to a device of a stationary type, in addition to components specifically for a mobile purpose. In other embodiments, the mobile terminal 200 may include more or fewer components than that shown in the figure, or combine some components, or separate some components, or include different component arrangements. The illustrated component may be implemented in hardware, software, or a combination of software and hardware. An interface connection relationship between the components is only schematically shown, and does not constitute a structural limitation on the mobile terminal 200. In other embodiments, the mobile terminal 200 may also adopt an interface connection manner different from that in FIG. 2, or a combination of a plurality of interface connection manners.

Figure 2:
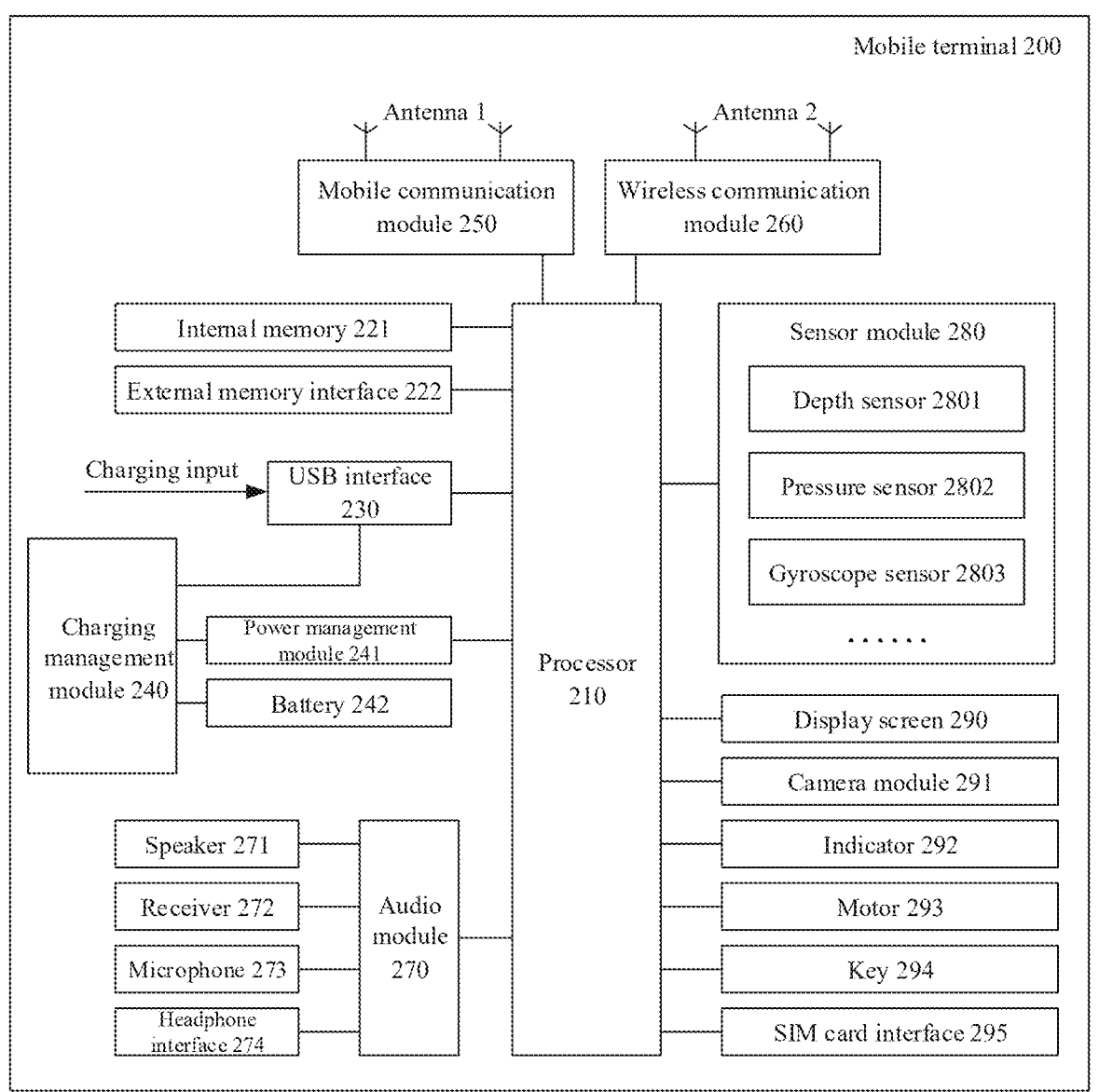
FIG. 2 shows a schematic diagram of an electronic device to which an embodiment of the present disclosure may be applied.

As shown in FIG. 2, the mobile terminal 200 may specifically include: a processor 210, an internal memory 221, an external memory interface 222, a universal serial bus (USB) interface 230, a charging management module 240, a power management module 241, a battery 242, an antenna 1, an antenna 2, a mobile communication module 250, a wireless communication module 260, an audio module 270, a speaker 271, a receiver 272, a microphone 273, a headphone interface 274, a sensor module 280, a display screen 290, a camera module 291, an indicator 292, a motor 293, a key 294, a subscriber identification module (SIM) card interface 295, and the like. The sensor module 280 may include a depth sensor 2801, a pressure sensor 2802, a gyroscope sensor 2803, and the like.

The processor 210 may include one or more processing units, for example, the processor 210 may include an application processor (AP), a modem processor, a graphics processing unit (GPU), an image signal processor (ISP), a controller, a video codec, a digital signal processor (DSP), a baseband processor and/or a neural-network processing unit (NPU), and the like. Different processing units may be independent devices, or may be integrated in one or more processors.

The NPU is a neural network (NN) computing processor, which can quickly process input information and continuously learn by referring to a biological neural network structure such as a transmission mode between neurons in human brain. An application such as intelligent cognition (for example, image recognition, face recognition, speech recognition, text understanding) of the mobile terminal 200 may be implemented through the NPU.

A memory is provided in the processor 210. The memory may store instructions for implementing six modular functions: detection instructions, connection instructions, information management instructions, analysis instructions, data transmission instructions, and notification instructions, and the execution thereof is controlled by the processor 210.

The charging management module 240 is used to receive charging input from a charger. The power management module 241 is used for connecting the battery 242, the charging management module 240 and the processor 210. The power management module 241 receives input from the battery 242 and/or the charging management module 240, and supplies power to the processor 210, internal memory 221, display screen 290, camera module 291, wireless communication module 260, and the like.

The wireless communication function of the mobile terminal 200 may be implemented by the antenna 1, the antenna 2, the mobile communication module 250, the wireless communication module 260, the modem processor, the baseband processor, and the like. The antenna 1 and the antenna 2 are used for transmitting and receiving electromagnetic wave signals; the mobile communication module 250 may provide a wireless communication solution including 2G/3G/4G/5G applied to the mobile terminal 200; the modem processor may include a modulator and a demodulator; and the wireless communication module 260 may provide a wireless communication solution including a wireless local area network (WLAN) (such as wireless fidelity (Wi-Fi) network, Bluetooth (BT) and the like) applied to the mobile terminal 200. In some embodiments, the antenna 1 of the mobile terminal 200 is coupled with mobile communication module 250, and the antenna 2 is coupled with the wireless communication module 260, so that the mobile terminal 200 may communicate with the network and other devices through wireless communication technology.

The mobile terminal 200 implements a display function through the GPU, display screen 290, application processor, and the like. The GPU is a microprocessor for image processing, and is connected to the display screen 290 and the application processor. The GPU is used to perform mathematical and geometric calculations for graphics rendering. The processor 210 may include one or more GPUs that execute program instructions to generate or alter display information.

The mobile terminal 200 may implement a shooting/photographing function through the ISP, camera module 291, video codec, GPU, display screen 290, application processor, and the like. The ISP is used to process data fed back by the camera module 291; the camera module 291 is used to capture still images or videos; the digital signal processor is used to process digital signals, and may also process other digital signals than the digital image signal; the video codec is used to compress or decompress the digital video, and the mobile terminal 200 may also support one or more video codecs.

The external memory interface 222 may be used to connect to an external memory card, such as a Micro SD card, to expand the storage capacity of the mobile terminal 200. The external memory card communicates with the processor 210 through the external memory interface 222 to realize the data storage function. For example, files such as music, video may be stored in external memory card.

The internal memory 221 may be used to store computer executable program codes, which include instructions. The internal memory 221 may include a program-storing area and a data-storing area. The program-storing area may store an operating system, an application program required for at least one function (such as a sound playback function, an image playback function), and the like. The data-storing area may store data (such as audio data, phone book) created during the use of the mobile terminal 200 and the like. In addition, the internal memory 221 may include a high-speed random access memory, and may also include a non-volatile memory, such as at least one magnetic disk storage device, flash memory device, universal flash storage (UFS), and the like. The processor 210 executes various functional applications and data processing of the mobile terminal 200 by executing instructions stored in the internal memory 221 and/or instructions stored in a memory provided in the processor.

The mobile terminal 200 may implement audio functions (such as music playback, recording) through the audio module 270, speaker 271, receiver 272, microphone 273, headphone interface 274, application processor, and the like.

The depth sensor 2801 is used to acquire depth information of scene. In some embodiments, the depth sensor may be provided in the camera module 291.

The pressure sensor 2802 is used to sense pressure signals, and may convert the pressure signals into electrical signals. In some embodiments, the pressure sensor 2802 may be provided in the display screen 290. There are many types of pressure sensors 2802, such as resistive pressure sensor, inductive pressure sensor, capacitive pressure sensor, and the like.

The gyroscope sensor 2803 may be used to determine a motion attitude of the mobile terminal 200. In some embodiments, an angular velocity of the mobile terminal 200 about three axes (i.e., x, y and z axes) may be determined by the gyroscope sensor 2803. The gyroscope sensor 2803 may be used for image stabilization, navigation, and somatosensory game scenes.

In addition, sensors with other functions such as an air pressure sensor, a magnetic sensor, an acceleration sensor, a distance sensor, a proximity light sensor, a fingerprint sensor, a temperature sensor, a touch sensor, an ambient light sensor, and a bone conduction sensor may also be provided in the sensor module 280 according to actual needs.

The mobile terminal 200 may further include other devices providing auxiliary functions. For example, the key 294 includes a power-on key, a volume key and the like, and a user may input by pressing the key to generate key signal input related to user settings and function control of the mobile terminal 200. Another example is the indicator 292, the motor 293, the SIM card interface 295, and the like.

In the related art, in the field of screen production, as there may be a problem in aspects such as equipment, parameter, operation and environmental interference, a product produced may have a defect. A detection is performed by using AOI after each process, and a large amount of image data may be generated. Professional operators are required to determine defect levels of these images. With the rise of artificial intelligence algorithms such as deep learning, AI algorithms are introduced into the process of determining the defect levels of the images, and thus an ADC system for automatically detecting defective images is generated.

The ADC system is mainly composed of four subsystems: data labeling system, GPU server (algorithm system), TMS system, and training system. In order to simplify operation processes and save hardware resources, the first three combinations of the above subsystems may be used in a production line to automatically detect defective images with AI algorithm. That is, the above system may run normally without the training system. However, the above system cannot update the algorithm model. If the AI model needs to be updated, it must be developed and deployed by an algorithm developer. The main function of the training system is to facilitate algorithm training in project development, and to facilitate model update during project operation and maintenance.

In a factory process, certain adjustments are usually made to the production process, AOI equipment and the like. The deep learning algorithm is a data-driven technology. Therefore, the adjustment of the production process or equipment will inevitably lead to changes in AOI images, resulting in a decreased accuracy of the algorithm model. On the other hand, for the production of new products, the model must also be re-adjusted to adapt to the different AOI images corresponding to the new products.

In order to improve the robustness of the ADC system, the system may train a new model after the AOI image changes to ensure the accuracy of the algorithm. The model trained by deep learning algorithms usually have a large number of training parameters. These training parameters often need to be adjusted manually for different images, which wastes human resources and may cause a loss due to human error.

In view of the above disadvantages, the present disclosure first provides a method for detecting a defect. Referring to FIG. 3, the above method for detecting the defect may include:

step S310, acquiring a sample data set including defective product data, and identifying feature information of the sample data set, the feature information including a number of samples in the sample data set;

step S320, acquiring an initial model, the initial model being a neural network model;

step S330, configuring a training parameter based on the feature information;

step S340, obtaining a target model by training, according to the training parameter, the initial model with the sample data set; and step S350, obtaining defect information of a product corresponding to the sample data set by inputting real data of the product into the target model, The training parameter includes at least one of a learning rate descent strategy, a total number of training rounds and a test strategy, the learning rate descent strategy includes a number of learning rate descents and a round number when a learning rate descends, and the test strategy includes a number of tests and a round number when testing.

Compared with the related art, in the technical solution provided by the embodiment, the training parameter of the model is determined according to the feature information obtained from the training data. On the one hand, the number of samples in the feature information is used to determine the learning rate descent strategy, the total number of training rounds and the test strategy in the training parameter, which does not require human operations, and thus saves human resources and avoids losses due to human errors. On the other hand, the learning rate descent strategy includes the number of learning rate descents and the round number when the learning rate descends, and the test strategy includes the number of tests and the round number when testing, therefore the number of learning rate descents, the round number when the learning rate descends, the number of tests and the round number when testing are configured. Since the learning rate descent strategy and the test strategy have a greater effect on defect detection, the configuration of the above training parameters may greatly improve the accuracy of the obtained target model for defect detection.

In step S310, the sample data set including the defective product data is acquired, and the feature information of the sample data set is identified. The feature information includes the number of samples in the sample data set.

In an embodiment, firstly, the sample data set may be acquired, and the feature information of the sample data set may be identified. Specifically, the number of samples in the sample data set may be acquired, and a type and a size of a defective product image included in the sample data set may be acquired, which is not specifically limited in the embodiment. The sample data set may include the defective product data, and the defective product data may include the defective product image or other product data of the defective product, which is not specifically limited in the embodiment.

In an embodiment, the feature information of the above sample data set may include the type and size of the defective product image in the sample data, and may also include the number of samples in the above sample data, and the number of samples may be 10000, 20000 and the like, and may also be customized according to user requirements, which is not specifically limited in the example implementation.

In step S320, the initial model is acquired. The initial model is the neural network model.

In an embodiment, the initial model may be a convolutional neural network (CNN) model, a target detection convolutional neural network (faster-RCNN) model, a recurrent neural network (RNN) model, and a generative adversarial network (GAN) model, which however is not limited thereto, and other neural network models known to those skilled in the art may also be used.

In an embodiment, the initial model may be determined according to the type of the defective product image. Specifically, in an embodiment, as required by an actual business, the same or different initial models may be selected according to images produced by different processes or of different product types. For example, when the image in the sample data set is an intermediate site image, the initial model may be a convolutional neural network (CNN) model; and when the image in the sample data set is a final site image, the initial model may be a convolutional neural network (CNN) model, or a target detection convolutional neural network (faster-RCNN) model, which is not specifically limited in the embodiment.

In step S330, the training parameter is configured based on the feature information.

In an embodiment, the training parameter may include the learning rate descent strategy, the total number of training rounds and the test strategy, and the configuring the training parameter based on the feature information may include configuring the learning rate descent strategy, the total number of training rounds and the test strategy according to the number of the samples in the feature information. The learning rate descent strategy includes the number of learning rate descents and the round number when the learning rate descends, and the test strategy includes the number of tests and the round number when testing.

Specifically, the above total number of training rounds is positively correlated with the number of samples. For example, if the number of samples is less than or equal to 10000, the total number of training rounds is configured to be 300000; and if the number of samples is greater than 10000, the total number of training rounds is configured with a formula of:

$$Y=300000+\text{INT}(X/10000)\times b$$

where Y represents the total number of training rounds, X represents the number of samples and is greater than or equal to 10000, INT is a rounding function, and b represents a growth factor having a fixed value and is greater than or equal to 30000 and less than or equal to 70000. In an embodiment, the value of b may be 50000 or 60000, which is not specifically limited in the embodiment. In an embodiment, a mapping relationship between the number of samples and the total number of training rounds may be the optimal result obtained after many experiments, or may be customized according to user needs, which is not specifically limited in the embodiment.

In an embodiment, the round number when the learning rate descends is positively correlated to the total number of training rounds, and the round number when testing is greater than or equal to the round number when the learning rate descends for a first time and less than or equal to the total number of training rounds. The learning rate descends a plurality of times, and at least two tests are performed within a preset number of rounds around the round number when the learning rate descends for a second time, for example, two, three or more tests may be performed, which is not specifically limited in the embodiment. During training, the learning rate descends a plurality of times, and the time number of the descent with the best result is selected after the learning rate descends the plurality of times, which may improve the accuracy of the obtained target model, and thus improve the accuracy of defect detection. Further, a plurality of tests are performed on the model during training, and the model having the best result may be selected as the target model, thereby improving the accuracy of defect detection.

In an embodiment, the manner of the above learning rate descent may be piecewise constant decay, exponential decay, natural exponential decay, cosine decay and the like, which is not specifically limited in the embodiment. The magnitude of the above learning rate descent is related to the above manner of the learning rate descent, and is related to each parameter in the configured manner of the learning rate descent, and may also be directly set to be a constant such as 0.1 and 0.05, which is not specifically limited in the embodiment.

In an embodiment of the present disclosure, the above feature information may include a size and a type of the defective product image in the sample data set, and configuring the training parameter based on the feature information may further include configuring a size of an input image input into the initial model according to the size and the type of the defective product image.

Specifically, the size of the input image is a first preset multiple of the size of the defective product image if the type of the defective product image indicates an AOI color image or a DM image; and the size of the input image is a second preset multiple of the size of the defective product image if the type of the defective product image indicates a TDI image. The first preset multiple is less than or equal to 1, and the second preset multiple is greater than or equal to 1.

In an embodiment, the above first preset multiple may be greater than or equal to 0.25 and less than or equal to 0.6, and the second preset multiple may be greater than or equal to 3 and less than or equal to 6. For example, the size of the input image is a technical indicator mainly determined by the name of the data set (that is, the image type and site to which the data set belongs). For an AOI color image of SD&Final&mask site, the average original image size is 2000*2000, so the input image size thereof may be any of 500, 688, 864, 1000, and 1200. For a TDI grayscale image, the average original image size is 64*64, so the input image size thereof is any of 192, 208, 224, 240, and 256. The size of the input image may be also be customized according to user requirements, which is not specifically limited in the embodiment.

In another embodiment, for example, the size of the input image is a technical indicator mainly determined by the name of the data set (that is, the image type and site to which the data set belongs). For an AOI color image of SD&Final&mask site, the average original image size is 2000*2000, so the input image size thereof may be at least two of 500, 688, 864, 1000, and 1200. For a TDI grayscale image, the average original image size is 64*64, so the input image size thereof is at least two of 192, 208, 224, 240, and 256. That is, the number of input images is greater than the number of original images, and in this case, the number of samples may be the number of the above input images.

In an embodiment of the present disclosure, the feature information may further include a defect level of the above defective product and the number of samples corresponding to each defect, and the training parameter may also include a confidence level. The confidence level in a training process may be configured according to the defect level and the number of samples corresponding to each defect.

Specifically, a preset number may be set first, and the number of samples corresponding to each defect is compared with the preset number. If the number of samples corresponding to the defect is greater than the preset number, the confidence level is configured according to the defect level. The above defect level includes a first defect level and a second defect level. The confidence level is configured as a first confidence level if the defect level is the first defect level; and the confidence level is configured as a second confidence level if the defect level is the second defect level. The second confidence level may be greater than the first confidence level.

In an embodiment, the above preset number may be 50, 100, and the like, or may be customized according to user requirements, which is not specifically limited in the embodiment. The first confidence level is greater than or equal to 0.6 and less than or equal to 0.7; and the second confidence level is greater than or equal to 0.8 and less than or equal to 0.9. The specific values of the first confidence level and the second confidence level may be customized according to user requirements, which is not specifically limited in the embodiment.

For example, for a defect with a high occurrence rate and a low importance, that is, a defect with a lower defect level, a lower confidence level may be configured. For example, a confidence level of 0.6 may be configured for a non-defective PI820 and a light-defective PI800. That is, when a probability score of the image at PI800 or PI820 exceeds 0.6, it is judged as the defect. For a defect with a low occurrence rate but a high importance, that is, a defect with a high defect level, a higher confidence level may be configured. For example, a confidence level of 0.85 may be configured for GT011 and SD011 with a serious defect. That is, a probability score of the image at GT011 or SD011 exceeds 0.6, it is judged as the defect. For the rest of the images with low confidence, they are all judged as unknown (not recognized by AI), which are to be processed manually to prevent missed judgments.

In an embodiment of the present disclosure, after configuring the training parameter based on the feature information, the above method may further include generating a training parameter display interface. The training parameter display interface is provided with a parameter modification identifier, and the parameter which can be modified may be displayed after a triggering operation of a user on the parameter modification identifier. The user may modify the above configured training parameter on a modification interface.

In step S340, the target model is obtained by training, according to the training parameter, the initial model with the sample data set.

In an embodiment of the present disclosure, after the configuration and modification of the above training parameter, the target model may be obtained by training the acquired initial model with the above sample data set.

The target model is mainly a neural network model based on deep learning. For example, the target model may be based on a feedforward neural network. A feedforward network may be implemented as an acyclic graph, in which nodes are arranged in layers. Typically, a feedforward network topology includes an input layer and an output layer separated by at least one hidden layer. The hidden layer transforms the input received by the input layer into a representation useful for generating the output in the output layer. Network nodes are fully connected to nodes in adjacent layers via edges, but there are no edges between nodes within each layer. Data received at the nodes of the input layer of the feedforward network is propagated (i.e., "feedforward") to the nodes of the output layer via an activation function which computes a node state of each successive layer in the network based on a coefficient ("weight"). The coefficient is respectively associated with each of the edges connecting these layers. The output of the target model may take various forms, which are not limited in the present disclosure. The target model may also include other neural network models, for example, a convolutional neural network (CNN) model, a recurrent neural network (RNN) model, and a generative adversarial network (GAN) model, which is not limited thereto, and other well-known neural network models to those skilled in the art may also be adopted.

Training the initial model with the sample data described above may include: selecting a network topology; using training data set representing a problem modeled by the network; and adjusting a weight until the network model appears to have a minimal error for all instances of the training data set. For example, during a supervised learning training process for a neural network, the output produced by the network in response to an input representing an instance in the training data set is compared to the "correct" labeled output of that instance; an error signal representing a difference between the output and the labeled output is calculated; and the weight associated with the connection is adjusted to minimize the error when the error signal is propagated back through the layers of the network. When the error of each output generated from the instance of the training data set is minimized, such initial model is considered "trained" and defined as the target model.

In an embodiment, when training the initial model, the above method for detecting the defect may further include: acquiring a loss curve in the above training process, and adjusting the training parameter according to the loss curve. Specifically, as shown in FIG. 4, the abscissa of the loss curve is the number of training rounds, and the ordinate thereof is a loss value. During the model training process, the loss curve is updated in real time according to the state in training, and the user may observe the loss curve and adjust the training parameter according to the curve state.

Specifically, if the loss curve is always chaotic and does not show a decreasing trend, it means that the configuration of the training parameter is not appropriate, and thus the training should be stopped, and the learning rate parameter and the learning rate descent strategy may be adjusted for retraining. If the loss curve has a slow decrease trend, it may continue to observe and stop the training, or increase the initial learning rate in a next training. If the loss curve still shows a decreasing trend after the training is completed (normally it should eventually become smooth), after the training is completed, a retraining may be performed by increasing the maximum number of training rounds.

In an embodiment of the present disclosure, according to the test strategy, the model with the number of training rounds reaching the round number when testing is output and used as a reference model. Then, the target model may be selected from a plurality of reference models according to accuracy rates and recall rates of the plurality of reference models. Further, the accuracy rate and recall rate corresponding to each defect in each reference model may be acquired, and then a confusion matrix of each reference model may be obtained according to the accuracy rate and recall rate corresponding to each defect. The above target model is acquired according to the above confusion matrix. When determining the above target model, an F1 score of each reference model may also be acquired, and the above target model may be acquired by referring to the F1 score and the confusion matrix at the same time, which is not specifically limited in the embodiment.

Specifically, an optimal reference model may be selected as the target model according to the accuracy rate and recall rate of the plurality of reference models in the confusion matrix. For example, the reference model with the largest accuracy rate and recall rate is selected as the target model, which is not specifically limited in the embodiment.

In an embodiment of the present disclosure, the above method may further include modifying the confidence level according to the confusion matrix. Specifically, the accuracy rate and recall rate of each defect in the confusion matrix may be analyzed in detail, and in conjunction with specific business requirements, the confidence level of the model after being online may be adjusted, so as to adjust the accuracy rate and recall rate of the online model for specific defects. For example, the recall rate of PI800 in the current confusion matrix is 0.90. The recall rate is generated when the confidence level is the default value of 0.8. PI800 is a non-important defect, which allows a moderate amount of over-judgment. In order to increase the recall rate of the defect in production line, the confidence level of PI800 may be set to 0.6-0.7 when the model is online, so that the recall rate of PI800 in production may be increased to 0.91-0.92. Correspondingly, the accuracy rate of PI800 in production may be decreased by 0.01-0.02. The increasement of the recall rate may reduce the workload of the operator judging the image. Therefore, the user may detailedly analyze the confusion matrix before the model is online according to the confusion matrix and production requirements, so as to customize the confidence level of each defect.

In step S350, the defect information of the detective product corresponding to the sample data set is obtained by inputting the real data of the detective product into the target model.

In an embodiment, after the target model is obtained, the real data of the product corresponding to the sample data is transmitted to the target model, and the defect information of the product is obtained by using the target model. The real data of the product may include data of the product to be detected corresponding to the product defect data in the sample data set.

The present disclosure also provides a method for training a model. As shown in FIG. 5, the method may include:

step S510, acquiring a sample data set including defective product data, and identifying feature information of the sample data set, the feature information including a number of samples in the sample data set;

step S520, acquiring an initial model, the initial model being a neural network model;

step S530, configuring a training parameter based on the feature information; and step S540, obtaining a target model by training, according to the training parameter, the initial model with the sample data set, the target model being configured to perform a detect detection on real data of a product corresponding to the sample data set.

The training parameter includes at least one of a learning rate descent strategy, a total number of training rounds and a test strategy, the learning rate descent strategy includes a number of learning rate descents and a round number when a learning rate descends, and the test strategy includes a number of tests and a round number when testing.

In step S510, the sample data set is acquired, and the feature information of the sample data set is identified. The feature information includes the number of samples in the sample data set.

In an embodiment of the present disclosure, the feature information of the above sample data set may include the type and size of the defective product image in the sample data, and may also include the number of samples in the above sample data, and the number of samples may be 10000, 20000 and the like, and may also be customized according to user requirements, which is not specifically limited in the example implementation.

In step S520, the initial model is acquired. The initial model is the neural network model.

In an embodiment, the initial model may be a convolutional neural network (CNN) model, a target detection convolutional neural network (faster-RCNN) model, a recurrent neural network (RNN) model, and a generative adversarial network (GAN) model, which however is not limited thereto, and other neural network models known to those skilled in the art may also be used.

In an embodiment, the initial model may be determined according to the type of the defective product image. Specifically, in an embodiment, as required by an actual business, there may be involved three types of images, which may be a final site image (SD_final site), an intermediate site image (mask site), and a tdi grayscale image. Different initial models may be selected according to different images. For example, when the image in the sample data set is an intermediate site image, the initial model may be a convolutional neural network (CNN) model; and when the image in the sample data set is a final site image, the initial model may be a convolutional neural network (CNN) model, or a target detection convolutional neural network (faster-RCNN) model, which is not specifically limited in the embodiment.

In step S530, the training parameter is configured based on the feature information.

In an embodiment, the training parameter may include the learning rate descent strategy, the total number of training rounds and the test strategy, and the configuring the training parameter based on the feature information may include configuring the learning rate descent strategy, the total number of training rounds and the test strategy according to the number of the samples in the feature information. The learning rate descent strategy includes the number of learning rate descents and the round number when the learning rate descends, and the test strategy includes the number of tests and the round number when testing.

Specifically, the above total number of training rounds is positively correlated with the number of samples. For example, if the number of samples is less than or equal to 10000, the total number of training rounds is configured to be 300000; and if the number of samples is greater than 10000, the total number of training rounds is configured with a formula of:

$$Y=300000+INT(X/10000)\times b$$

where Y represents the total number of training rounds, X represents the number of samples and is greater than or equal to 10000, INT is a rounding function, and b represents a growth factor having a fixed value and is greater than or equal to 30000 and less than or equal to 70000. In an embodiment, the value of b may be 50000 or 60000, which is not specifically limited in the embodiment. In an embodiment, a mapping relationship between the number of samples and the total number of training rounds may be the optimal result obtained after many experiments, or may be customized according to user needs, which is not specifically limited in the embodiment.

In an embodiment, the round number when the learning rate descends is positively correlated to the total number of training rounds, and the round number when testing is greater than or equal to the round number when the learning rate descends for a first time and less than or equal to the total number of training rounds. The learning rate descends a plurality of times, and at least two tests are performed within a preset number of rounds around the round number when the learning rate descends for a second time, for example, two, three or more tests may be performed, which is not specifically limited in the embodiment. During training, the learning rate descends a plurality of times, and the time number of the descent with the best result is selected after the learning rate descends the plurality of times, which may improve the accuracy of the obtained target model, and thus improve the accuracy of defect detection. Further, a plurality of tests are performed on the model during training, and the model having the best result may be selected as the target model, thereby improving the accuracy of defect detection.

In an embodiment, the manner of the above learning rate descent may be piecewise constant decay, exponential decay, natural exponential decay, cosine decay and the like, which is not specifically limited in the embodiment. The magnitude of the above learning rate descent is related to the above manner of the learning rate descent, and is related to each parameter in the configured manner of the learning rate descent, and may also be directly set to be a constant such as 0.1 and 0.05, which is not specifically limited in the embodiment.

For details, a reference may be made to the configuration method in the above-mentioned method for detecting the detection, which will not be repeated here.

In step S540, the target model is obtained by training, according to the training parameter, the initial model with the sample data set. The target model is configured to perform the detect detection on the real data of the product corresponding to the sample data set.

In an embodiment of the present disclosure, after the configuration and modification of the above training parameter, the target model may be obtained by training the acquired initial model with the above sample data set.

The target model is mainly a neural network model based on deep learning. For example, the target model may be based on a feedforward neural network. A feedforward network may be implemented as an acyclic graph, in which nodes are arranged in layers. Typically, a feedforward network topology includes an input layer and an output layer separated by at least one hidden layer. The hidden layer transforms the input received by the input layer into a representation useful for generating the output in the output layer. Network nodes are fully connected to nodes in adjacent layers via edges, but there are no edges between nodes within each layer. Data received at the nodes of the input layer of the feedforward network is propagated (i.e., "feedforward") to the nodes of the output layer via an activation function which computes a node state of each successive layer in the network based on a coefficient ("weight"). The coefficient is respectively associated with each of the edges connecting these layers. The output of the target model may take various forms, which are not limited in the present disclosure. The target model may also include other neural network models, for example, a convolutional neural network (CNN) model, a recurrent neural network (RNN) model, and a generative adversarial network (GAN) model, which is not limited thereto, and other well-known neural network models to those skilled in the art may also be adopted.

Training the initial model with the sample data described above may include: selecting a network topology; using training data set representing a problem modeled by the network; and adjusting a weight until the network model appears to have a minimal error for all instances of the training data set. For example, during a supervised learning training process for a neural network, the output produced by the network in response to an input representing an instance in the training data set is compared to the "correct" labeled output of that instance; an error signal representing a difference between the output and the labeled output is calculated; and the weight associated with the connection is adjusted to minimize the error when the error signal is propagated back through the layers of the network. When the error of each output generated from the instance of the training data set is minimized, such initial model is considered "trained" and defined as the target model.

In an embodiment, when training the initial model, the above method for detecting the defect may further include: acquiring a loss curve in the above training process, and adjusting the training parameter according to the loss curve. Specifically, as shown in FIG. 4, the abscissa of the loss curve is the number of training rounds, and the ordinate thereof is a loss value. During the model training process, the loss curve is updated in real time according to the state in training, and the user may observe the loss curve and adjust the training parameter according to the curve state. Specifically, if the loss curve is always chaotic and does not show a decreasing trend, it means that the configuration of the training parameter is not appropriate, and thus the training should be stopped, and the learning rate parameter and the learning rate descent strategy may be adjusted for retraining. If the loss curve has a slow decrease trend, it may continue to observe and stop the training, or increase the initial learning rate in a next training. If the loss curve still shows a decreasing trend after the training is completed (normally it should eventually become smooth), after the training is completed, a retraining may be performed by increasing the maximum number of training rounds.

In an embodiment of the present disclosure, according to the test strategy, the model with the number of training rounds reaching the round number when testing is output and used as a reference model. Then, the target model may be selected from a plurality of reference models according to accuracy rates and recall rates of the plurality of reference models. Further, the accuracy rate and recall rate corresponding to each defect in each reference model may be acquired, and then a confusion matrix of each reference model may be obtained according to the accuracy rate and recall rate corresponding to each defect. The above target model is acquired according to the above confusion matrix. When determining the above target model, an F1 score of each reference model may also be acquired, and the above target model may be acquired by referring to the F1 score and the confusion matrix at the same time, which is not specifically limited in the embodiment.

Specifically, an optimal reference model may be selected as the target model according to the accuracy rate and recall rate of the plurality of reference models in the confusion matrix. For example, the reference model with the largest accuracy rate and recall rate is selected as the target model, which is not specifically limited in the embodiment. The details of training the initial model may refer to corresponding description of training the initial model in the above method for detecting the defect, which is not repeated herein.

The present disclosure also provides a method for training a model. Referring to FIG. 6, the method for training the model may include:

step S610, acquiring a sample data set including defective product data in response to a configuration operation of a user on a parameter of the sample data set, and identifying feature information of the sample data set, the feature information including a number of samples in the sample data set;

step S620, acquiring an initial model, the initial model being a neural network model;

Step S630, configuring a training parameter based on the feature information, and generating a training parameter display interface; and step S640, obtaining a target model by training, according to the training parameter, the initial model with the sample data set, the target model being configured to perform a detect detection on real data of a product corresponding to the sample data set.

The training parameter includes at least one of a learning rate descent strategy, a total number of training rounds and a test strategy, the learning rate descent strategy includes a number of learning rate descents and a round number when a learning rate descends, and the test strategy includes a number of tests and a round number when testing.

The above steps are described in detail below.

In step S610, the sample data set including the defective product data is acquired in response to the configuration operation of the user on the parameter of the sample data set, and the feature information of the sample data set is identified. The feature information includes the number of samples in the sample data set.

In an example embodiment of the present disclosure, the sample data may be acquired in response to the configuration operation of the user on the parameter of the sample data set, for example, the sample data corresponding to a plurality of defects and an acquiring identifier corresponding to the sample data are displayed on a graphical user interface. When the user triggers the above acquiring identifier, the sample data corresponding to the above acquiring identifier is acquired.

In an embodiment, referring to FIG. 20, in response to a task establishment operation of the user, a training task is established and a parameter configuration interface of the sample data set is generated. The user may configure the parameter about the sample data set on the above parameter configuration interface. The parameter of the sample data set may include a department, a section, a site, an image type, a product, a training type, and the like. Then, in response to the parameter configuration operation of the user, the sample data set corresponding to the sample data parameter is acquired automatically, and the feature information in the above sample data is identified. In another embodiment, after the sample data is acquired, the training task corresponding to the sample data set may be established according to the parameter of the above sample data set, which is not specifically limited in the embodiment.

The details of acquiring the feature information in the above sample data set has been described above, which will not be repeated herein.

In step S620, the initial model is acquired. The initial model is a neural network model.

In an embodiment, the details of acquiring the initial model may refer to the description in the method for detecting the defect, which will not be repeated here.

In step S630, the training parameter is configured based on the feature information, and the training parameter display interface is generated.

In an embodiment of the present disclosure, the details of configuring the training parameter based on the feature information has been described in the method for detecting the defect, and therefore will not be repeated here.

In an embodiment of the present disclosure, as shown in FIG. 20, the above sample configuration interface includes a training parameter viewing identifier, and a server may generate the above training parameter display interface in response to a triggering operation of the user on the training parameter viewing identifier.

In another embodiment of the present disclosure, referring to FIG. 7, after the configuration of the above training parameter, the training parameter display interface may be directly generated, and the training parameter display interface includes configuration information of each of the above training parameters and a parameter modification identifier.

The above training parameter may include the total number of training rounds, the learning rate descent strategy, the test strategy, the confidence level, and the size of the image input to the initial model, and may also include other parameters, which are not specifically limited in the embodiment.

In an embodiment, the specific details of the total number of training rounds, the learning rate descent strategy, the test strategy, the confidence level, and the size of the image input to the initial model have been described in the above method for detecting the defect, therefore which are not repeated herein.

In an embodiment, referring to FIG. 7, the server may modify the above training parameter in response to the triggering operation of the user on the above parameter modification identifier. After the above modification identifier is triggered, each training parameter is configured to be in a modifiable state, and a determination identifier is generated. After the user triggers the determination identifier, the modification of the training parameter is completed. The training parameter may be modified based on an interactive interface, without directly modifying codes, which is convenient for the operation of system operation and maintenance personnel who do not understand programming, and improves the convenience of operation.

In an embodiment of the present disclosure, the feature information may further include a defect level of the above defective product and the number of samples corresponding to each defect, and the training parameter may also include a confidence level. The confidence level in a training process may be configured according to the defect level and the number of samples corresponding to each defect. The above parameter display interface further includes a confidence level configuration identifier.

In an embodiment, referring to FIG. 8, a confidence level configuration interface may be generated in response to a triggering operation of the user on the confidence configuration identifier. The confidence level configuration interface includes the number of samples corresponding to each defect and a selection identifier corresponding to each defect, and the confidence level configuration interface is configured to configure, in response to a determination operation of the user on the selection identifier, the confidence level of the defect corresponding to the selection operation. Specifically, in response to the determination operation of the user on the selection identifier of the defect with the number of samples greater than a preset number in the above confidence level configuration interface, the confidence level is configured according to the defect level. The above defect level includes a first defect level and a second defect level. The confidence level is configured as a first confidence level if the defect level is the first defect level; and the confidence level is configured as a second confidence level if the defect level is the second defect level. The second confidence level may be greater than the first confidence level.

In an embodiment, the above preset number may be 50, 100, and the like, or may be customized according to user requirements, which is not specifically limited in the embodiment. The first confidence level is greater than or equal to 0.6 and less than or equal to 0.7; and the second confidence level is greater than or equal to 0.8 and less than or equal to 0.9. The specific values of the first confidence level and the second confidence level may be customized according to user requirements, which is not specifically limited in the embodiment.

For example, for a defect with a high occurrence rate and a low importance, a lower confidence level may be configured. For example, a confidence level of 0.6 may be configured for a non-defective PI820 and a light-defective PI800. That is, when a probability score of the image at PI800 or PI820 exceeds 0.6, it is judged as the defect. For a defect with a low occurrence rate but a high importance, a higher confidence level may be configured. For example, a confidence level of 0.85 may be configured for GT011 and SD011 with a serious defect. That is, when a probability score of the image at GT011 or SD011 exceeds 0.6, it is judged as the defect. For the rest of the images with low confidence, they are all judged as unknown, which are to be processed manually to prevent missed judgments.

In step S640, the target model is obtained by training, according to the training parameter, the initial model with the sample data set. The target model is configured to perform the detect detection on the real data of the product corresponding to the sample data set.

In an embodiment, the specific process of training has been described in detail in the above method for detecting the defect, and therefore will not be repeated here.

In an exemplary implementation of the present disclosure, referring to FIG. 9, when the above initial model is trained, a training schedule may be generated and displayed. The training schedule may include a task detail identifier and a task cancellation identifier. When the user triggers the task detail identifier, a loss curve in the training process is generated and displayed, and then the user may adjust the above training parameter according to the loss curve.

The specific details of adjusting the training parameter according to the loss curve have already been described in detail in the above method for detecting the defect, and therefore will not be repeated here. In an embodiment, when the user triggers the above task cancellation identifier, the training of the initial model is stopped.

FIG. 10 shows an embodiment of the present disclosure.

In an embodiment of the present disclosure, according to the test strategy, the model with the number of training rounds reaching the round number when testing is output and used as a reference model. Then, the target model may be selected from a plurality of reference models according to accuracy rates and recall rates of the plurality of reference models. Further, the accuracy rate and recall rate corresponding to each defect in each reference model may be acquired, and then a confusion matrix of each reference model may be obtained according to the accuracy rate and recall rate corresponding to each defect. The above target model is acquired according to the above confusion matrix. When determining the above target model, an F1 score of each reference model may also be acquired, and the above target model may be acquired by referring to the F1 score and the confusion matrix at the same time, which is not specifically limited in the embodiment.

Specifically, referring to FIG. 11, an optimal reference model may be selected as the target model according to the accuracy rate and recall rate of the plurality of reference models in the confusion matrix. Specifically, in response to the selection operation of the user from the plurality of reference models, the reference model corresponding to the selection operation is determined as the target model. For example, the reference model with the largest accuracy rate and recall rate is selected as the target model, which is not specifically limited in the embodiment. The user may make a selection in a selection bar and then click a confirmation identifier to complete the determination of the target model.

In an embodiment of the present disclosure, in response to the modification operation of the user on the confidence level, the confidence level may be updated according to the confusion matrix. Specifically, the accuracy rate and recall rate of each defect in the confusion matrix may be analyzed in detail, and in conjunction with specific business requirements, the confidence level of the model after being online may be adjusted, so as to adjust the accuracy rate and recall rate of the online model for specific defects. For example, the recall rate of PI800 in the current confusion matrix is 0.90. The recall rate is generated when the confidence level is the default value of 0.8. PI800 is a non-important defect, which allows a moderate amount of over-judgment. In order to increase the recall rate of the defect in production line, the confidence level of PI800 may be set to 0.6-0.7 when the model is online, so that the recall rate of PI800 in production may be increased to 0.91-0.92. Correspondingly, the accuracy rate of PI800 in production may be decreased by 0.01-0.02. The increasement of the recall rate may reduce the workload of the operator judging the image. Therefore, the user may detailedly analyze the confusion matrix before the model is online according to the confusion matrix and production requirements, so as to customize the confidence level of each defect.

Still further, the present disclosure also provides a system for detecting a defect. Referring to FIG. 12, the system may include a data management module 1202, a model management module 1204 and a training management module 1203. The data management module 1202 is configured to store and manage sample data; the training management module 1203 is configured to perform the above method for detecting the defect and the above method for training the model; and the model management module 1204 is configured to store, display and manage the target model.

In an embodiment of the present disclosure, the above system for detecting the defect may further include a user management module. The user management module 1201 is configured for adding, deleting, modifying, checking rights management and/or password management of user information.

Referring to FIG. 13, first, the above system adopts BS or CS architecture and consists of three parts: a back-end server 1306, a front-end server 1303, and a shared storage 1304. An operating end may operate through a browser by using a factory PC 1307. As a subsystem responsible for training-related tasks in the ADC system, the training system communicates with the data labeling system, TMS system, and GPU Server (algorithm system) of the ADC system. The training system may be externally connected between the data labeling system and the TMS system to provide the TMS system 1305 with an updated target model and other related services.

The training system and the data labeling system 1302 interact with data and images through the database and the shared storage 1304 (NAS network storage). The training system communicates and interacts with the GPU Server (algorithm system) 1301 through the TCP/IP protocol, thereby controlling the GPU Server 1301 for model training and automatic testing. The training system and the TMS system 1305 transmit model data through the FTP protocol, and exchange model information through the database. The training system uses the HTTP protocol to interact with front-end and back-end services and Web interface.

Each of the above modules will be described in detail below.

Specifically, the user management module is a module for system user management and system information management, which is used for adding, deleting, modifying, checking, rights management and/or password management of user information, and provides the adding, deleting, modifying, checking functions of information of the work department, section, and site to which the system is applied. The user management module may include user information and system information. The user may input a user name and password to enter the training system. After entering, the completed training module is entered by default, so that the user may directly view the training status of the existing model. All users currently managed may be checked, and rights management may also be set in the system, in which function, the adding, deleting and modifying of the user may be achieved.

In an embodiment of the present disclosure, the data management module is configured to store and manage the sample data. As the deep learning AI algorithm is a data-driven method, different production processes in factories and AOI grabbing apparatus lead to large intra-class and inter-class differences of data, so it is difficult to use a general model to solve all problems. To this end, an individual model may be trained for specific data to achieve full coverage of real-time inference services in factory production.

The data set management module may process these data sets according to a unified standard, thus providing convenience for model training. Data set management is divided into training data set management and preparation data set management. The data in the preparation data set management is the original data labeled by the data labeling system. After statistical verification by the user, it may be imported into the training data set management. The data in the training data set management may be directly submitted to the corresponding training task for model training.

Specifically, as shown in FIG. 14, the data labeled by the data labeling system may be automatically synchronized (or manually synchronized) to the preparation data set management of the data set management. The synchronization, statistics, display of the original data set may be performed in the data set management. The data set management mainly displays detailed information such as product corresponding to each data set, types and number of defects, the number of images, the defect with the fewest images, and the update time.

The data set management may be a process of manual maintenance. A synchronization identifier may be clicked to directly synchronize the data labeled by the data labeling system. If the manual synchronization is not performed, the system may synchronize data regularly every day. A statistics identifier may be clicked to make statistics of the detailed information of each data set, including the defect type in each data set, the number of images in each type, and a distribution table.

When managing the training data set, referring to FIG. 15, the data obtained after the statistical verification of the above preparation data set may be subjected to functions such as creation, modification, image management and the like so as to perform a series of operations on the data set to generate a sample data set on which the model may be trained.

There is a corresponding relationship between the sample data set and the model. Each sample data set may be used to train different models by using different training parameters, and then the user may select the model according to the relevant standards. Therefore, a first step in model training is to create a sample data set corresponding to the model to be trained on the interface.

It should be noted that there is a specific rule for the name of the sample data set of the system for detecting the defect. That is, the system may automatically configure the training parameter for training according to the feature information of the sample data set. The name of the sample data set is of course also a feature of the data set. Therefore, the naming of the sample data set must follow a specific rule. The naming rule may be as follows. For the model of the SD/Final site, the name of the Sub defect model is "product_product name", the name of the main defect model is "main defect_product name" (where the product name is two letters or numbers). For example, the data set of the sub defect of ak is named product_ak; and the data set of the main defect of ak is named main defect_ak.

In an embodiment, for the Mask site model, the sub defect model of the Mask site is named "mask site name" (where the site name is four letters or numbers). The Mask site has no main defect model. For example, the model data set of 1500 site is named mask_1500.

In an embodiment, for the TDI model, the TDI model is currently applied to the SD/Final site, and there is no main defect model. The naming rule is "tdi_tdiX" (where X is a number). For example, the model corresponding to the regular product is named tdi_tdi1.

Referring to FIG. 16, after the department, section, or site are selected, the name of the sample data set needs to be manually entered into the system by the user according to the above naming rules. After the input is completed, the creation of the new data set is completed. After the change identifier is clicked, the name of the new data set is entered, and the change of the name of the data set may be completed by clicking the confirmation identifier. The sample data set may be deleted by clicking the deletion identifier next to the corresponding name of the sample data set, and the deletion herein refers to the deletion of the data imported into the model. Referring to FIG. 17, after the detail identifier is clicked, detail information of each sample data set including location of the sample data set, internal organization structure and image preview therein is displayed. The middle column is a directory structure of the image in the sample data set, and the rightmost column is an image list in the selected defect type folder, in which the image may be previewed and deleted.

The model management module is configured to store, display and manage the target model, specifically, as shown in FIG. 18, which may include name change, deletion and details display of the target model. After the user clicks the details identifier, all version information of a model is displayed, including model name, model version number, whether the model is online, trainer, training completion time, accuracy rate and recall rate of the model, model path and other information. When the deletion identifier is clicked, a trained target model is deleted.

The training management module may realize submission of training task, adaptive configuration of training parameter, management of training task, and display of automatic training test result. The adaptive configuration of training parameter and the automatic training test are functions that a traditional training system does not have, and these two functions may greatly reduce the difficulty of algorithm model training. Parameter adjustment experience of algorithm users in the development process may be wrote into the system logic to achieve adaptive parameter adjustment and automatic test, so that operation and maintenance personnel and even users who have no algorithm development basis can use the module to train a model that may achieve the production accuracy of the production line. The training management module is mainly divided into three submodules: trained, training and canceled.

In an embodiment, referring to FIG. 19, no matter in a trained, training, or canceled interface, a training task may be submitted by clicking a creation identifier. It should be noted that the premise of submitting the training task is that a corresponding sample data set has been created or that a sample data set related to the above training task is directly obtained by the system according to the above training task.

In order to facilitate the model training, as shown in FIG. 20, for a complex production scene where the system for detecting the defect is located, in which the data characteristics of large intra-class differences and inter-class differences, the training system has the function of automatically configuring the training parameter according to the characteristics of the data set. After "Site", "Image Type", "Product" (see the following table for the naming rule of the product name) and "Training Type" are selected, "View Modification" next to "Training Parameter" may be clicked, and a few seconds later, the relevant configuration parameters of the model may be popped up automatically, details of which please refer to that shown in FIG. 7.

TABLE 1

| Model | Image type | Product name |
|---|---|---|
| SD/Final site color image | AOI color image | Two letters or numbers, such as ak, ub |
| SD/Final site grayscale image | TDI image | tdiX, such as tdi1, tdi2 |
| Mask site color image | AOI color image | Four letters or numbers, such as 1500/9500 |

The naming rule of product name may refer to Table 1. The relevant data set and initial model (optional) are selected, the model name (optional) is input, the training type mainly being the main defect and sub defect (the correspondence between the training type and the image type is shown in Table 2) is selected, the training parameter is modified, and then the confirmation is clicked.

TABLE 2

| Model | Image type | Training type |
|---|---|---|
| SD/Final site color image | AOI color image | Sub defect or main defect |
| SD/Final site grayscale image | TDI image | Only sub defect |
| Mask site color image | AOI color image | Only sub defect |

Referring to FIGS. 7 and 8, the defect setting identifier on the interface needs to be clicked. In the pop-up interface, a check is made according to the number of images in the data set, and the confidence level is modified as needed. The specific check rule is that when the number of samples is greater than or equal to the preset number, the check is made. The details of the preset number have been described in detail in the above method for detecting the defect, which will not be repeated herein.

In an embodiment, when the interface as shown in FIG. 8 pops up, the system will give the default value of each defect confidence based on the experience of the algorithm user, and these default values are determined through a plurality of tests based on the importance and occurrence rate of defects provided by the service. For some defects with high occurrence rate and low importance, the confidence level is set loosely.

For example, a confidence level of 0.6 may be configured for a non-defective PI820 and a light-defective PI800. That is, when a probability score of the image at PI800 or PI820 exceeds 0.6, it is judged as the defect. For a defect with a low occurrence rate but a high importance, a strict confidence level may be configured. For example, a confidence level of 0.85 may be configured for GT011 and SD011 with a serious defect. That is, a probability score of the image at GT011 or SD011 exceeds 0.6, it is judged as the defect. For the rest of the images with low confidence, they are all judged as unknown (not recognized by AI), which are to be processed manually to prevent missed judgments.

As mentioned above, for all the defects that pop up, according to the needs of the business, the algorithm user may select the best confidence level for the default configuration after many experiments. During the training process, it may be automatically adjusted according to the above confidence level configuration condition.

Referring to FIG. 9, the training management module may view the task in training, including the data set name of the training task, the trainer, the reason for the training, the current training round number, the total number of training rounds, and other information. In the operation, there are two operation identifiers including cancelation and details.

The current training task may be cancelled by clicking the cancelation identifier. Referring to FIG. 4, the training loss curve of the current training task may be generated and displayed by clicking the details identifier. The training effect of the model may be judged at some degree according to the trend of the loss curve.

In an embodiment, the abscissa of the loss curve is the number of training rounds, and the ordinate thereof is a loss value. During the model training process, the loss curve is updated in real time according to the state in training, and the user may observe the loss curve and adjust the training parameter according to the curve state. Specifically, if the loss curve is always chaotic and does not show a decreasing trend, it means that the configuration of the training parameter is not appropriate, and thus the training should be stopped, and the learning rate parameter and the learning rate descent strategy may be adjusted for retraining. If the loss curve has a slow decrease trend, it may continue to observe and stop the training, or increase the initial learning rate in a next training. If the loss curve still shows a decreasing trend after the training is completed (normally it should eventually become smooth), after the training is completed, a retraining may be performed by increasing the maximum number of training rounds.

The setting rule of the confidence level is as follows. In the confidence level input box of the training parameter interface, the default confidence levels of all defects may be set. If it selects not to input the confidence level of each defect in the training defect and confidence level setting interface, the value on the previous page will be used by default. If a numeric value is entered, the confidence level of this interface is used.

Referring to FIG. 21, the training management module may also display the trained model and the tasks completed by the training, including the model name generated by each data set (the model is a model for different training rounds corresponding to one data set, not only one model, and the models selected for testing when submitting training will be displayed here), the time when the training is completed, and the reason for the training.

Referring to FIG. 19, the operation includes two identifiers: "view results" and "select best", which are respectively for viewing the results and selecting the best. After the "view results" is clicked, a confusion matrix of a plurality of models (which is related to the test round number initially set in the training parameter setting, and which are 6 models by default) will be popped up. This function is a supplement to the traditional training system, which converts the relevant indicators of the algorithm into a relatively intuitive table for data display, and thus is convenient for operation and maintenance personnel or users to view according to the table format they are very familiar with, so as to select models according to the indicators of interest. After the "select best" identifier is clicked, the test results of each test model will be popped up. The most important indicators are accuracy (accuracy rate) and recall (recall rate) and F1 score, and according to the accuracy (accuracy rate) and recall (recall rate) and F1 score along with the confusion matrix above, whether the model is on-line or not is decided.

In addition to guiding the model to be online, the user may also analyze in detail the accuracy rate and recall rate of each defect in the confusion matrix, and in conjunction with specific business requirements, adjust the confidence level of the model after being online, so as to adjust the accuracy rate and recall rate of the online model for specific defects. For example, the recall rate of PI800 in the current confusion matrix is 0.90. The recall rate is generated when the confidence level is the default value of 0.8. PI800 is a non-important defect, which allows a moderate amount of over-judgment. In order to increase the recall rate of the defect in production line, the confidence level of PI800 may be set to 0.6-0.7 when the model is online, so that the recall rate of PI800 in production may be increased to 0.91-0.92. Correspondingly, the accuracy rate of PI800 in production may be decreased by 0.01-0.02. The increasement of the recall rate may reduce the workload of the operator judging the image. Therefore, the user may analyze in detail the confusion matrix before the model is online according to the confusion matrix and production requirements, so as to customize the confidence level of each defect. After the model is selected by checking for confirmation, the model may be viewed in the model management interface of the TMS system, so as to be online in the production line (the model may also be viewed in the model management function module).

It should be noted that the above-mentioned drawings are only schematic illustrations of the processes included in the method according to the embodiment of the present disclosure, and are not intended to be limiting. It is easy to understand that the processes shown in the above drawings do not indicate or limit the chronological order of these processes. In addition, it is also readily understood that these processes may be performed synchronously or asynchronously, for example, in multiple modules.

Figure 22:
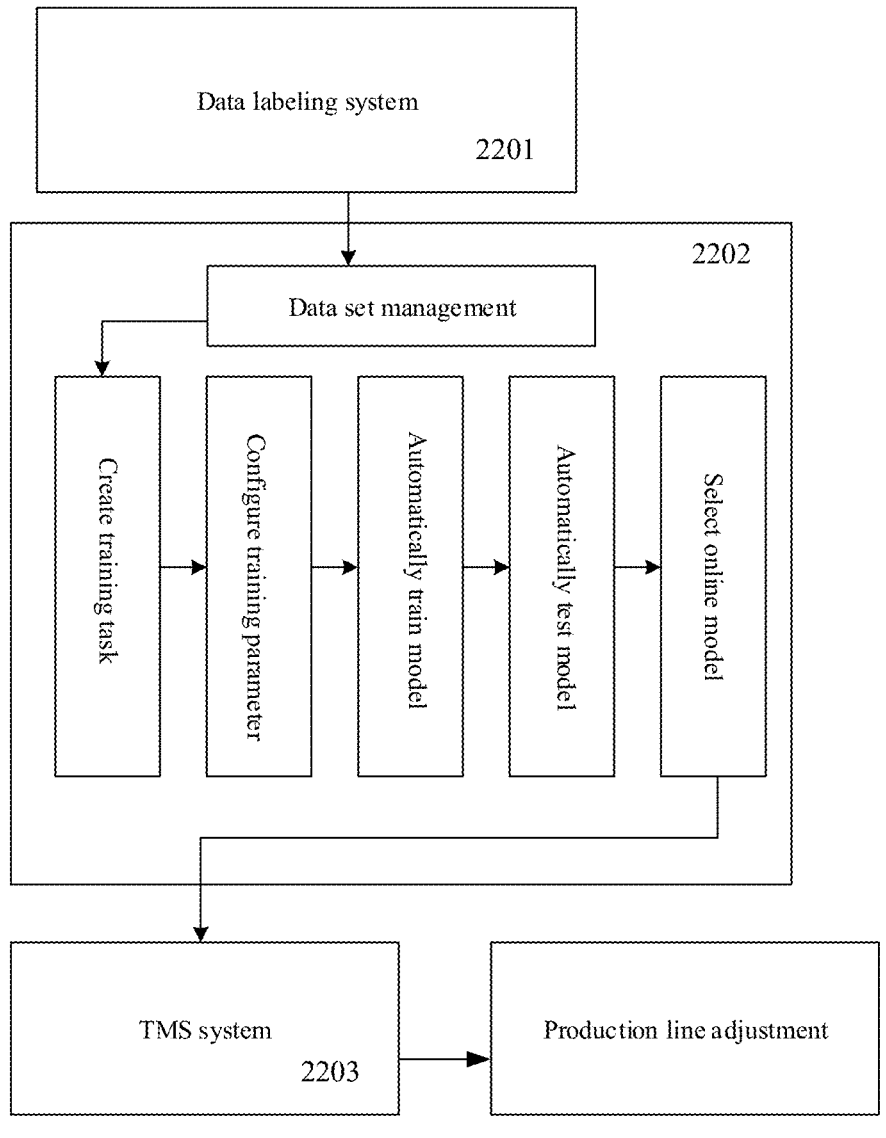
FIG. 22 schematically shows a schematic diagram of a data transmission direction in a system for detecting a defect in an embodiment of the present disclosure.

In an embodiment, referring to FIG. 22, the sample data set is generated by the data labeling system 2201, and the system for detecting the defect 2202 of the present disclosure is called to train the same into a corresponding model, which is then uploaded to the TMS system 2203 for being online of model inference services. The specific process is described in detail below. The user organizes and labels the training data in the data labeling system. By embedding AI supervised algorithms and traditional unsupervised algorithms, the functions of automatic data labeling and semi-automatic data labeling are realized, which greatly reduces the workload of data labeling. The data labeled by this module may be automatically synchronized to the relevant directory of the training management module. The training sample data set is imported in the training management module. A name of the sample data set is created according to the training task, and is imported into the data labeling system to label the completed data. The relevant information is wrote into the database at the same time. After the data import is complete, operations of viewing details, modifying data and deleting data may be performed. The training task is submitted. After the training set is imported, the corresponding training tasks are submitted in the training task management module. In the process of submitting the training task, the user needs to select the site, image type, training type and other information according to the feature information of the sample data set. After the relevant information is selected, the training management module may adjust the training parameter adaptively. Thus, the configured training parameter is displayed on the interface for the user's reference, and the user may choose to use the default parameter or modify the same. After it is completed, the training task may be submitted. The model is automatically trained and tested. After the training task is submitted, the training management module sends the training task and configured training parameter to the AI algorithm system in the background. Then, the AI algorithm system automatically trains the model according to the received task, and automatically tests the model after the training is completed. The changes of various indicators during the training process may be drawn as icons and displayed in the system for users to keep track of the training status at any time. The training and testing results are processed. After the training is completed, the AI algorithm system stores the target model in the shared storage, and sends the relevant training results to the training management module. After the training management module receives the message from the AI algorithm system, it displays the training results in the trained section of the training management module. Users may view various indicators, confusion matrix, and analysis of some necessary training indicators after the model is automatically tested. The model is online in advance. According to the above indicators, the user may select the optimal model to be online in advance, i.e., the model may be synchronized to the model management module of the TMS system 2203. The model to be online in advance may be easily viewed and managed in the model management module of the training management module. The model is online. The model to be online in advance has been synchronized to the model management database of the TMS system 2203, and the user may perform offline test and official online of the model in the TMS system.

Figure 23:
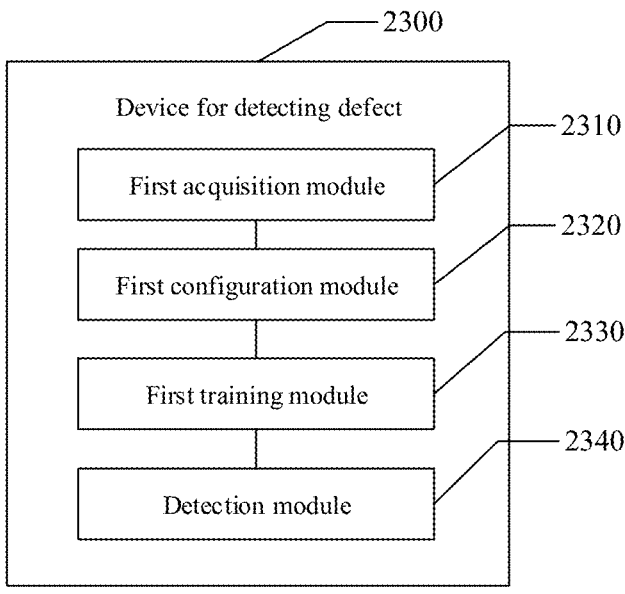
FIG. 23 schematically shows a composition diagram of a device for detecting a defect in an embodiment of the present disclosure.

Further, referring to FIG. 23, an embodiment further provides a device 2300 for detecting a defect, which includes a first acquisition module 2310, a first configuration module 2320, a first training module 2330 and a detection module 2340. The first acquisition module 2310 is configured to: acquire a sample data set including defective product data, and identify feature information of the sample data set, the feature information including a number of samples in the sample data set; and acquire an initial model, the initial model being a neural network model. The first configuration module 2320 is configured to configure a training parameter based on the feature information. The first training module 2330 is configured to obtain a target model by training, according to the training parameter, the initial model with the sample data set. The detection module 2340 is configured to obtain defect information of a product corresponding to the sample data set by inputting real data of the product into the target model. The training parameter includes at least one of a learning rate descent strategy, a total number of training rounds and a test strategy, the learning rate descent strategy includes a number of learning rate descents and a round number when a learning rate descends, and the test strategy includes a number of tests and a round number when testing.

Figure 24:
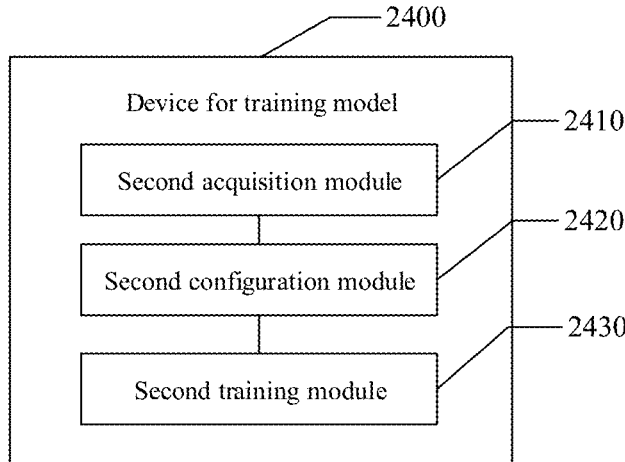
FIG. 24 schematically shows a composition diagram of a device for training a model in an embodiment of the present disclosure.

Further, referring to FIG. 24, an embodiment further provides a device 2400 for training a model, which includes a second acquisition module 2410, a second configuration module 2420, and a second training module 2430. The second acquisition module 2410 is configured to acquire a sample data set including defective product data, and identify feature information of the sample data set, the feature information including a number of samples in the sample data set; acquire an initial model, the initial model being a neural network model. The second configuration module 2420 is configured to configure a training parameter based on the feature information. The second training module 2430 is configured to obtain a target model by training, according to the training parameter, the initial model with the sample data set, the target model being configured to perform a detect detection on real data of a product corresponding to the sample data set. The training parameter includes at least one of a learning rate descent strategy, a total number of training rounds and a test strategy, the learning rate descent strategy includes a number of learning rate descents and a round number when a learning rate descends, and the test strategy includes a number of tests and a round number when testing.

Figure 25:
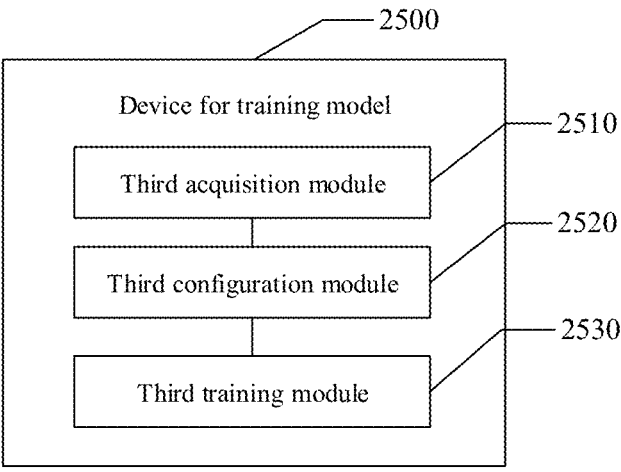
FIG. 25 schematically shows a composition diagram of another device for training a model in an embodiment of the present disclosure.

Further, referring to FIG. 25, an embodiment further provides a device 2500 for training a model, which includes a third acquisition module 2510, a third configuration module 2520, and a third training module 2530. The third acquisition module 2510 is configured to acquire a sample data set including defective product data in response to a configuration operation of a user on a parameter of the sample data set, and identify feature information of the sample data set, the feature information including a number of samples in the sample data set; and acquire an initial model, the initial model being a neural network model. The third configuration module 2520 is configured to configure a training parameter based on the feature information, and generate a training parameter display interface. The third training module 2530 is configured to obtain a target model by training, according to the training parameter, the initial model with the sample data set, the target model being configured to perform a detect detection on real data of a product corresponding to the sample data set. The training parameter displayed on the training parameter display interface includes at least one of a learning rate descent strategy, a total number of training rounds and a test strategy, the learning rate descent strategy includes a number of learning rate descents and a round number when a learning rate descends, and the test strategy includes a number of tests and a round number when testing.

The specific details of each module in the above device have been described in detail in the method embodiment, and the undisclosed details thereof may refer to the method embodiment, which thus will not be repeated.

As will be appreciated by those skilled in the art, various aspects of the present disclosure may be implemented as a system, method or program product. Therefore, various aspects of the present disclosure may be embodied in the following forms: a complete hardware implementation, a complete software implementation (including firmware, microcode, and the like), or a combination implementation of hardware and software, which may be collectively referred to herein as "circuit", "module" or "system".

An embodiment of the present disclosure also provides a computer-readable storage medium on which a program product capable of implementing the above method in the present specification is stored. In some possible embodiments, various aspects of the present disclosure may also be implemented in the form of a program product, which includes program code, when the program product runs on a terminal device, the program code is used to cause the terminal device to execute steps according to various embodiments of the present disclosure described in the "example method" part in the specification.

It should be noted that the computer-readable medium shown in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. A more specific example of computer readable storage media may include, but is not limited to, electrical connection with one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination thereof.

In the present disclosure, the computer-readable storage medium may be any tangible medium that contains or stores a program that may be used by or in conjunction with an instruction execution system, apparatus, or device. In the present disclosure, however, the computer-readable signal medium may include a data signal propagated in baseband or as part of a carrier wave with computer-readable program code embodied thereon. Such propagated data signals may take a variety of forms, including but not limited to electromagnetic signal, optical signal, or any suitable combination thereof. The computer-readable signal medium may also be any computer-readable medium other than a computer-readable storage medium, and the computer-readable medium can transmit, propagate, or send the program for use by or in connection with the instruction execution system, apparatus, or device. Program code embodied on the computer-readable medium may be transmitted using any suitable medium including, but not limited to, wireless, wireline, optical fiber cable, RF or any suitable combination thereof.

Furthermore, the program code for performing the operations of the present disclosure may be written in any combination of one or more programming languages, including object-oriented programming languages such as Java, C++, as well as conventional procedural programming languages such as C language or similar programming language. The program code may be executed entirely on a user computing device, partly on the user device, as a stand-alone software package, partly on the user computing device and partly on a remote computing device, or entirely on the remote computing device or server. Where the remote computing device is involved, the remote computing device may be connected to the user computing device over any kind of network, including a local area network (LAN) or a wide area network (WAN), or may be connected to an external computing device, e.g., via the Internet provided by an Internet service provider.

Those skilled in the art may easily obtain other embodiments of the present disclosure upon consideration of the specification and practice of the invention disclosed herein. The present application is intended to cover any variations, uses, or adaptations of the present disclosure that follow the general principles of the present disclosure and include the common knowledge or techniques in the technical field not disclosed by the present disclosure. The specification and examples are to be regarded as exemplary only, with the true scope and spirit of the present disclosure being indicated by the claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for detecting a defect, comprising:
acquiring, by a terminal device, a sample data set comprising defective product data, and identifying feature information of the sample data set, the feature information comprising a number of samples in the sample data set;
transmitting, by the terminal device, the sample data set and the feature information to a server;

acquiring, by the server, an initial model, the initial model being a neural network model;

setting, by the server, a learning rate descent strategy, a total number of training rounds and a test strategy in a training parameter for the initial model based on the number of samples in the feature information;

obtaining, by the server, a target model by inputting the sample data set into the initial model and training, according to the training parameter, the initial model with the sample data set; and obtaining, by the server, defect information of a product corresponding to the sample data set by inputting real data of the product into the target model, wherein the learning rate descent strategy comprises a number of learning rate descents and a round number when a learning rate descends, and the test strategy comprises a number of tests and a round number at which a test is performed on a trained model, wherein the server configures the total number of training rounds according to the number of samples under a preset rule, comprising:

configuring, in response to the number of samples being less than or equal to 10000, the total number of training rounds to 300000; and configuring, in response to the number of samples being greater than 10000, the total number of training rounds with a formula of:

$$Y=300000+\mathrm{INT}(X/10000)\times b$$

where Y represents the total number of training rounds, X represents the number of samples and is greater than or equal to 10000, INT is a rounding function, and b represents a growth factor having a fixed value and is greater than or equal to 30000 and less than or equal to 70000, wherein the server configures the round number when the learning rate descends to be proportional to the total number of training rounds, and the round number at which the test is performed on the trained model to be greater than or equal to the round number when the learning rate descends for a first time and less than or equal to the total number of training rounds, wherein the method further comprises:

generating, by the server, and displaying a training parameter display interface, wherein the training parameter display interface displays the learning rate descent strategy, the total number of training rounds and the test strategy set by the server.

2. The method according to claim 1, wherein the learning rate descends a plurality of times, and at least two tests are performed within a preset number of rounds around the round number when the learning rate descends for a second time.

3. The method according to claim 2, wherein the learning rate descends three times, and at least three tests are performed within the preset number of rounds around the round number when the learning rate descends for the second time.

4. The method according to claim 1, wherein the learning rate descent strategy comprises a learning rate descent manner and a learning rate descent magnitude.

5. The method according to claim 1, wherein the defective product data comprises a defective product image, and the feature information comprises a size and a type of the defective product image in the sample data set, and wherein the method further comprises:

adjusting a size of an input image input into the initial model according to the size and the type of the defective product image.

6. The method according to claim 5, wherein adjusting the size of the input image input into the initial model according to the size and the type of the defective product image comprises:

adjusting the size of the input image to be a first preset multiple of the size of the defective product image in response to that the type of the defective product image indicates an AOI color image or a DM image; and adjusting the size of the input image to be a second preset multiple of the size of the defective product image in response to that the type of the defective product image indicates a TDI image, wherein the first preset multiple is less than or equal to 1, and the second preset multiple is greater than or equal to 1.

7. The method according to claim 6, wherein the input image comprises images with a plurality of sizes corresponding to a same defective product image.

8. The method according to claim 5, wherein the feature information further comprises a defect level of the defective product, and wherein the method further comprises:

configuring a confidence level in a training process according to defect levels corresponding to respective defects.

9. The method according to claim 8, wherein the defect level comprises a first defect level and a second defect level, and configuring the confidence level in the training process according to the defect levels corresponding to the respective defects comprises:

configuring the confidence level as a first confidence level in response to the defect level being the first defect level; and configuring the confidence level as a second confidence level in response to the defect level being the second defect level, wherein the second confidence level is greater than the first confidence level.

10. The method according to claim 1, further comprising acquiring the initial model according to a type of a defective product image.

11. The method according to claim 1, wherein the training parameter display interface comprises a parameter modification identifier; and wherein the method further comprises:

updating the training parameter in response to a triggering operation of a user on the parameter modification identifier.

12. The method according to claim 1, further comprising:

acquiring a loss curve in a training process; and updating the training parameter according to the loss curve.

13. The method according to claim 1, wherein obtaining, by the server, the target model by inputting the sample data set into the initial model and training, according to the training parameter, the initial model comprises:

acquiring a plurality of reference models according to the test strategy, and acquiring an accuracy rate and a recall rate of each of the reference models; and determining the target model from the reference models according to the accuracy rate and the recall rate of each of the reference models.

14. The method according to claim 1, wherein obtaining, by the server, the target model by inputting the sample data set into the initial model and training, according to the training parameter, the initial model comprises:

acquiring a plurality of reference models according to the test strategy, and determining a confusion matrix of each of the reference models; and determining the target model from the reference models according to the confusion matrix.

15. The method according to claim 14, further comprising: updating a confidence level according to the confusion matrix.

16. A method for training a model, comprising:

acquiring, by a terminal device, a sample data set comprising defective product data, and identifying feature information of the sample data set, the feature information comprising a number of samples in the sample data set;

transmitting, by the terminal device, the sample data set and the feature information to a server;

acquiring, by the server, an initial model, the initial model being a neural network model;

setting, by the server, a learning rate descent strategy, a total number of training rounds and a test strategy in a training parameter for the initial model based on the number of samples in the feature information; and obtaining, by the server, a target model by inputting the sample data set into the initial model and training, according to the training parameter, the initial model with the sample data set, the target model being configured to perform a defect detection on real data of a product corresponding to the sample data set, wherein the learning rate descent strategy comprises a number of learning rate descents and a round number when a learning rate descends, and the test strategy comprises a number of tests and a round number at which a test is performed on a trained model, wherein the server configures the total number of training rounds according to the number of samples under a preset rule, comprising:

configuring, in response to the number of samples being less than or equal to 10000, the total number of training rounds to 300000; and configuring, in response to the number of samples being greater than 10000, the total number of training rounds with a formula of:

$$Y=300000+\mathrm{INT}(X/10000){\times}b$$

where Y represents the total number of training rounds, X represents the number of samples and is greater than or equal to 10000, INT is a rounding function, and b represents a growth factor having a fixed value and is greater than or equal to 30000 and less than or equal to 70000, wherein the server configures the round number when the learning rate descends to be proportional to the total number of training rounds, and the round number at which the test is performed on the trained model to be greater than or equal to the round number when the learning rate descends for a first time and less than or equal to the total number of training rounds, wherein the method further comprises:

generating, by the server, and displaying a training parameter display interface, wherein the training parameter display interface displays the learning rate descent strategy, the total number of training rounds and the test strategy set by the server.

17. A method for training a model, comprising:

acquiring, by a terminal device, a sample data set comprising defective product data in response to a configuration operation of a user on a parameter of the sample data set, and identifying feature information of the sample data set, the feature information comprising a number of samples in the sample data set;

transmitting, by the terminal device, the sample data set and the feature information to a server;

acquiring, by the server, an initial model, the initial model being a neural network model;

setting, by the server, a learning rate descent strategy, a total number of training rounds and a test strategy in a training parameter for the initial model based on the number of samples in the feature information; and obtaining, by the server, a target model by inputting the sample data set into the initial model and training, according to the training parameter, the initial model with the sample data set, the target model being configured to perform a defect detection on real data of a product corresponding to the sample data set, wherein the learning rate descent strategy comprises a number of learning rate descents and a round number when a learning rate descends, and the test strategy comprises a number of tests and a round number at which a test is performed on a trained model, wherein the server configures the total number of training rounds according to the number of samples under a preset rule, comprising:

configuring, in response to the number of samples being less than or equal to 10000, the total number of training rounds to 300000; and configuring, in response to the number of samples being greater than 10000, the total number of training rounds with a formula of:

$$Y=300000+\mathrm{INT}(X/10000){\times}b$$

where Y represents the total number of training rounds, X represents the number of samples and is greater than or equal to 10000, INT is a rounding function, and b represents a growth factor having a fixed value and is greater than or equal to 30000 and less than or equal to 70000, wherein the server configures the round number when the learning rate descends to be proportional to the total number of training rounds, and the round number at which the test is performed on the trained model to be greater than or equal to the round number when the learning rate descends for a first time and less than or equal to the total number of training rounds, wherein the method further comprises:

generating, by the server, and displaying a training parameter display interface, wherein the training parameter display interface displays the learning rate descent strategy, the total number of training rounds and the test strategy set by the server.

\*    \*    \*    \*    \*